United States Patent
Ren et al.

(10) Patent No.: US 12,464,500 B2
(45) Date of Patent: Nov. 4, 2025

(54) RESOURCE PROCESSING METHOD AND DEVICE, AND READABLE STORAGE MEDIUM

(71) Applicant: DATANG MOBILE COMMUNICATIONS EQUIPMENT CO., LTD., Beijing (CN)

(72) Inventors: Xiaotao Ren, Beijing (CN); Teng Ma, Beijing (CN); Tianxin Liu, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 224 days.

(21) Appl. No.: 18/257,905

(22) PCT Filed: Dec. 17, 2021

(86) PCT No.: PCT/CN2021/139099
§ 371 (c)(1),
(2) Date: Jun. 16, 2023

(87) PCT Pub. No.: WO2022/151916
PCT Pub. Date: Jul. 21, 2022

(65) Prior Publication Data
US 2024/0057039 A1    Feb. 15, 2024

(30) Foreign Application Priority Data
Jan. 15, 2021    (CN) .......................... 202110055776.3

(51) Int. Cl.
*H04W 72/04* (2023.01)
(52) U.S. Cl.
CPC .................... *H04W 72/04* (2013.01)
(58) Field of Classification Search
CPC ..... H04W 72/04; H04W 72/25; H04W 72/40; H04W 72/541; H04W 72/02;
(Continued)

(56) References Cited

U.S. PATENT DOCUMENTS 9,516,640 B2 * 12/2016 Pazhyannur ...... H04W 72/0446
9,621,362 B2 * 4/2017 Livanos ............. H04L 41/0893
(Continued)

FOREIGN PATENT DOCUMENTS

CN      109392015 A      2/2019
CN      109392134 A *    2/2019    ............ H04W 72/53
(Continued)

OTHER PUBLICATIONS

Extended European Search Report issued Jun. 14, 2024 in European Application No. 21919103.8.
(Continued)

*Primary Examiner* — Mahendra R Patel
(74) *Attorney, Agent, or Firm* — Harness, Dickey & Pierce, P.L.C.

(57) ABSTRACT

A resource processing method, a resource processing device and a readable storage medium are provided, to increase a success rate of the transmission of a Sidelink data packet. The resource processing method includes: determining, by a first UE, a first conflict resource set in a resource aware manner; determining, by the first UE, a second conflict resource set, wherein the second conflict resource set is determined in accordance with coordination information from a second UE; performing, by the first UE, resource exclusion in an initial candidate resource set in accordance with the first conflict resource set and the second conflict resource set, to obtain a remaining candidate resource set; when the quantity of resources in the remaining candidate resource set does not meet a predetermined requirement, re-performing, by the first UE, resource exclusion in the initial candidate resource set.

20 Claims, 11 Drawing Sheets

(58) Field of Classification Search
CPC ..... H04W 76/14; H04W 72/51; H04W 24/08;
H04W 72/53; H04W 72/54; H04W 92/18
USPC ........................................................ 370/329
See application file for complete search history.

(56) References Cited

U.S. PATENT DOCUMENTS

| | | | |
|---|---|---|---|
| 9,629,042 B2 * | 4/2017 | Warburton | H04W 36/00835 |
| 9,736,861 B2 * | 8/2017 | Chatterjee | H04W 76/10 |
| 9,843,687 B2 * | 12/2017 | Campbell | H04W 8/18 |
| 10,498,503 B2 * | 12/2019 | Tavildar | H04W 72/121 |
| 10,986,652 B2 * | 4/2021 | Tang | H04L 5/1469 |
| 11,497,021 B2 * | 11/2022 | Onggosanusi | H04W 72/23 |
| 2017/0265201 A1 * | 9/2017 | Farnham | H04W 72/541 |

FOREIGN PATENT DOCUMENTS

| | | | | |
|---|---|---|---|---|
| CN | 111756487 A * | 10/2020 | | H04W 16/14 |
| CN | 111865505 A | 10/2020 | | |
| EP | 3046386 A1 * | 7/2016 | | H04W 72/23 |
| EP | 3442284 A1 * | 2/2019 | | H04W 72/20 |
| EP | 3737174 A1 | 11/2020 | | |
| WO | WO-2009070928 A1 * | 6/2009 | | H04W 72/27 |
| WO | WO-2011150719 A1 * | 12/2011 | | H04W 72/541 |
| WO | WO-2018171807 A1 * | 9/2018 | | H04W 72/563 |
| WO | WO-2020073987 A1 * | 4/2020 | | H04W 72/04 |
| WO | WO-2020108086 A1 * | 6/2020 | | H04W 72/541 |
| WO | WO-2020143734 A1 * | 7/2020 | | H04W 72/20 |
| WO | WO-2021016805 A1 * | 2/2021 | | H04L 5/00 |
| WO | WO-2021077910 A1 * | 4/2021 | | H04W 72/30 |
| WO | WO-2021168826 A1 * | 9/2021 | | H04L 5/00 |

OTHER PUBLICATIONS

Notice of Reasons for Refusal issued Jun. 11, 2024 in Japanese Application No. 2023-541122.
Fujitsu, "Considerations on Inter-UE Coordination for Mode 2 Enhancements," 3GPP TSG RAN WG1 Meeting #103-E, R1-2007788, Oct. 26, 2020.
LG Electronics, "Discussion on feasibility and benefits for mode 2 enhancement," 3GPP TSG RAN WG1 Meeting #103, R1-2007896, Oct. 26, 2020.
Mitsubishi Electric, "Inter-UE coordination for enhanced resource allocation," 3GPP TSG RAN WG1 #103, R1-2008861, Oct. 26, 2020.
First Office Action issued Oct. 25, 2024 in Chinese Application No. 202110055776.3.
Lenovo, Motorola Mobility, "Discussion on sidelink resource allocation enhancements in mode2," 3GPP TSG, RAN WG2 Meeting #112, R2-2009869, Nov. 2, 2020.
Request for the submission of an Opinion issued Sep. 15, 2025 in Korean Application No. 10-2023-7026832.
MediaTek Inc., "Discussion on Mode 2 enhancements," 3GPP TSG RAN WG1 #103-e, R1-2008975, Nov. 1, 2020.

* cited by examiner

RESOURCE PROCESSING METHOD AND DEVICE, AND READABLE STORAGE MEDIUM

CROSS-REFERENCE TO RELATED APPLICATION

This application is the U.S. national phase of PCT Application No. PCT/CN2021/139099 filed on Dec. 17, 2021, which claims the priority of the Chinese patent application No. 202110055776.3 filed in China on Jan. 15, 2021, the disclosures of each of which are incorporated herein by reference in their entireties.

TECHNICAL FIELD

The present disclosure relates to the field of communication technology, in particular to a resource processing method, a resource processing device, and a readable storage medium.

BACKGROUND

In a $5^{th}$-Generation (5G) New Radio (NR) Vehicle-to-Everything (V2X) system, User Equipments (UEs) directly communicate with each other via a Sidelink. Before the transmission of service data, firstly time/frequency resources used for the data transmission through the Sidelink need to be determined. As a main principle, the time/frequency resources are determined in such a manner as to prevent the occurrence of any collision between the time/frequency resources used by different UEs, thereby to prevent the occurrence of mutual interference.

In the NR V2X, there are two resource scheduling modes. In a resource allocation mode 1, the time/frequency resources used for the communication between the UEs through the Sidelink are scheduled by a base station uniformly. In a resource allocation mode 2, without the participation of the base station, the UE selects, on its own initiative, the time/frequency resources used for the communication between the UEs through the Sidelink.

In the related art, in the resource allocation mode 2, the UE performs resource exclusion in accordance with its own resource aware result, so as to exclude conflict resources sensed by the UE itself. However, for the method in the related art, limited information is taken into consideration during the resource exclusion, and there still probably exists a resource collision, so a transmission failure of a data packet may occur.

SUMMARY

An object of the present disclosure is to provide a resource processing method, a resource processing device and a readable storage medium, so as to increase a success rate of the transmission of a Sidelink data packet.

In one aspect, the present disclosure provides in some embodiments a resource processing method, including: determining, by a first UE, a first conflict resource set in a resource aware manner; determining, by the first UE, a second conflict resource set, wherein the second conflict resource set is determined in accordance with coordination information from a second UE; performing, by the first UE, resource exclusion in an initial candidate resource set in accordance with the first conflict resource set and the second conflict resource set, to obtain a remaining candidate resource set; and when the quantity of resources in the remaining candidate resource set does not meet a predetermined requirement, re-performing, by the first UE, resource exclusion in the initial candidate resource set.

In addition, the performing, by the first UE, the resource exclusion in the initial candidate resource set in accordance with the first conflict resource set and the second conflict resource set to obtain the remaining candidate resource set includes: excluding, by the first UE, the first conflict resource set in the initial candidate resource set to obtain a first candidate resource set, and excluding, by the first UE, the second conflict resource set in the first candidate resource set to obtain a second candidate resource set as the remaining candidate resource set; or excluding, by the first UE, the second conflict resource set in the initial candidate resource set to obtain a third candidate resource set, and excluding, by the first UE, the first conflict resource set in the third candidate resource set to obtain a fourth candidate resource set as the remaining candidate resource set.

In addition, the determining, by the first UE, the second conflict resource set in accordance with the coordination information includes: determining, by the first UE, the second conflict resource set in conflict resources indicated through the coordination information in accordance with the coordination information and/or a resource coordination threshold.

In addition, the excluding, by the first UE, the second conflict resource set in the first candidate resource set to obtain the second candidate resource set includes: excluding, by the first UE, an updated second conflict resource set in the first candidate resource set to obtain the second candidate resource set, wherein the updated second conflict resource set is obtained through removing a part of resources in the second conflict resource set.

In addition, the re-performing, by the first UE, the resource exclusion in the initial candidate resource set includes: re-determining, by the first UE, at least one of the first conflict resource set or the second conflict resource set; and re-performing, by the first UE, the resource exclusion in the initial candidate resource set in accordance with the at least one of the re-determined first conflict resource set or the re-determined second conflict resource set.

In addition, the re-determining, by the first UE, the first conflict resource set includes adjusting, by the first UE, a resource aware threshold, and re-determining, by the first UE, the first conflict resource set in accordance with the adjusted resource aware threshold.

In addition, the re-determining, by the first UE, the second conflict resource set includes: when the coordination information includes interference intensity information, adjusting, by the first UE, the resource coordination threshold, and re-determining, by the first UE, the second conflict resource set in accordance with the adjusted resource coordination threshold; and when the coordination information does not include the interference intensity information, removing, by the first UE, a part of resources from the second conflict resource set to obtain to obtain an updated second conflict resource set, and taking, by the first UE, the updated second conflict resource set as the re-determined second conflict resource set.

In addition, the quantity of the removed resources is determined in accordance with a preconfigured value and the quantity of resources indicated in the coordination information.

In addition, the predetermined requirement is that the quantity of resources in the remaining candidate resource set is greater than a product of a preset threshold and the quantity of resources in the initial candidate resource set.

In another aspect, the present disclosure provides in some embodiments a resource processing method, including: determining, by a first UE, a first conflict resource set; performing, by the first UE, resource exclusion in an initial candidate resource set in accordance with the first conflict resource set, to obtain a first candidate resource set; determining, by the first UE, a second conflict resource set; performing, by the first UE, resource exclusion in accordance with the first candidate resource set and the second conflict resource set, to obtain a second candidate resource set; and when the quantity of resources in the second candidate resource set does not meet a predetermined requirement, re-performing, by the first UE, resource exclusion in the second candidate resource set. The first conflict resource set is determined in a resource aware manner, and the second conflict resource set is determined in accordance with coordination information received from a second UE; or the first conflict resource set is determined in accordance with the coordination information received from the second UE, and the second conflict resource set is determined in a resource aware manner.

In addition, when the first conflict resource set is determined in a resource aware manner and the second conflict resource set is determined in accordance with the coordination information received from the second UE, the performing, by the first UE, the resource exclusion in the initial candidate resource set in accordance with the first conflict resource set to obtain the first candidate resource set includes: excluding, by the first UE, the first conflict resource set in the initial candidate resource set to obtain the first candidate resource set; and when the quantity of resources in the first candidate resource set does not meet the predetermined requirement, adjusting, by the first UE, a resource aware threshold, re-determining, by the first UE, the first conflict resource set in accordance with the adjusted resource aware threshold, and excluding, by the first UE, the re-determined first conflict resource set in the initial candidate resource set, until the quantity of resources in the first candidate resource set meets the predetermined requirement.

In addition, the determining, by the first UE, the second conflict resource set includes determining, by the first UE, the second conflict resource set in accordance with the coordination information and a resource coordination threshold.

In addition, the performing, by the first UE, the resource exclusion in accordance with the first candidate resource set and the second conflict resource set to obtain the second candidate resource set includes, when the quantity of resources in the first candidate resource set meets the predetermined requirement, excluding, by the first UE, the second conflict resource set in the first candidate resource set to obtain the second candidate resource set, or excluding, by the first UE, an updated second conflict resource set in the first candidate resource set to obtain the second candidate resource set, wherein the updated second conflict resource set is obtained through removing a part of resources in the second conflict resource set.

In addition, the re-performing, by the first UE, the resource exclusion in the first candidate resource set when the quantity of resources in the second candidate resource set does not meet the predetermined requirement includes: re-determining, by the first UE, the second conflict resource set; and re-performing, by the first UE, the resource exclusion in the first candidate resource set in accordance with the re-determined second conflict resource set.

In addition, the re-determining, by the first UE, the second conflict resource set includes: when the coordination information includes interference intensity information, adjusting, by the first UE, a resource coordination threshold, and re-determining the second conflict resource set in accordance with the adjusted resource coordination threshold; and when the coordination information does not include interference intensity information, removing, by the first UE, a part of resources in the second conflict resource set to obtain an updated second conflict resource set, and taking, by the first UE, the updated second conflict resource set as the re-determined second conflict resource set.

In addition, when the first conflict resource set is determined in accordance with the coordination information received from the second UE, the second conflict resource set is determined in a resource aware manner, and the coordination information includes the interference intensity information, the determining, by the first UE, the first conflict resource set includes determining, by the first UE, the first conflict resource set in conflict resources indicated in the coordination information in accordance with the coordination information and/or a resource coordination threshold.

In addition, the performing, by the first UE, the resource exclusion in the initial candidate resource set in accordance with the first conflict resource set to obtain the first candidate resource set includes: excluding, by the first UE, the first conflict resource set in the initial candidate resource set to obtain the first candidate resource set; and when the quantity of resources in the first candidate resource set does not meet the predetermined requirement, adjusting, by the first UE, the resource coordination threshold, re-determining, by the first UE, the first conflict resource set in accordance with the adjusted resource coordination threshold, and excluding, by the first UE, the re-determined first conflict resource set in the initial candidate resource set, until the quantity of resources in the first candidate resource set meets the predetermined requirement.

In addition, when the first conflict resource set is determined in accordance with the coordination information received from the second UE, the second conflict resource set is determined in a resource aware manner and the coordination information does not include the interference intensity information, the performing, by the first UE, the resource exclusion in the initial candidate resource set in accordance with the first conflict resource set to obtain the first candidate resource set includes: excluding, by the first UE, the first conflict resource set in the initial candidate resource set to obtain the first candidate resource set, or excluding, by the first UE, an updated first conflict resource set in the initial candidate resource set to obtain the first candidate resource set, wherein the updated first conflict resource set is obtained through removing a part of resources in the first conflict resource set; and when the quantity of resources in the first candidate resource set does not meet the predetermined requirement, removing, by the first UE, a part of resources to obtain a re-determined first conflict resource set, and excluding, by the first UE, the re-determined first conflict resource set in the initial candidate resource set, until the quantity of resources in the first candidate resource set meets the predetermined requirement.

In addition, the performing, by the first UE, the resource exclusion in accordance with the first candidate resource set and the second conflict resource set to obtain the second candidate resource set includes, when the quantity of resources in the first candidate resource set meets the predetermined requirement, excluding, by the first UE, the second conflict resource set in the first candidate resource set to obtain the second candidate resource set.

In addition, the re-performing, by the first UE, the resource exclusion in the first candidate resource set when the quantity of resources in the second candidate resource set does not meet the predetermined requirement includes: re-determining, by the first UE, the second conflict resource set; and re-performing, by the first UE, the resource exclusion in the first candidate resource set in accordance with the re-determined second conflict resource set.

In addition, the re-determining, by the first UE, the second conflict resource set includes adjusting, by the first UE, a resource aware threshold, and re-determining, by the first UE, the second conflict resource set in accordance with the adjusted resource aware threshold.

In addition, the predetermined requirement is that the quantity of resources in the second candidate resource set or the first candidate resource set is greater than a product of a preset threshold and the quantity of resources in the initial candidate resource set.

In addition, the quantity of the removed resources is determined in accordance with a preconfigured value and the quantity of conflict resources indicated in the coordination information.

In yet another aspect, the present disclosure provides in some embodiments a resource processing device for a first UE, including a memory, a transceiver and a processor. The memory is configured to store therein a computer program. The transceiver is configured to transmit and receive data under the control of the processor. The processor is configured to read the computer program in the memory to: determine a first conflict resource set in a resource aware manner; determine a second conflict resource set, wherein the second conflict resource set is determined in accordance with coordination information from a second UE; perform resource exclusion in an initial candidate resource set in accordance with the first conflict resource set and the second conflict resource set, to obtain a remaining candidate resource set; and when the quantity of resources in the remaining candidate resource set does not meet a predetermined requirement, re-perform resource exclusion in the initial candidate resource set.

In addition, the processor is further configured to read the computer program in the memory to: exclude the first conflict resource set in the initial candidate resource set to obtain a first candidate resource set, and exclude the second conflict resource set in the first candidate resource set to obtain a second candidate resource set as the remaining candidate resource set; or exclude the second conflict resource set in the initial candidate resource set to obtain a third candidate resource set, and exclude the first conflict resource set in the third candidate resource set to obtain a fourth candidate resource set as the remaining candidate resource set.

In addition, the processor is further configured to read the computer program in the memory to determine the second conflict resource set in conflict resources indicated through the coordination information in accordance with the coordination information and/or a resource coordination threshold.

In addition, the processor is further configured to read the computer program in the memory to exclude an updated second conflict resource set in the first candidate resource set to obtain the second candidate resource set, wherein the updated second conflict resource set is obtained through removing a part of resources in the second conflict resource set.

In addition, the processor is further configured to read the computer program in the memory to: re-determine at least one of the first conflict resource set or the second conflict resource set; and re-perform the resource exclusion in the initial candidate resource set in accordance with the at least one of the re-determined first conflict resource set or the re-determined second conflict resource set.

In addition, the processor is further configured to read the computer program in the memory to adjust a resource aware threshold, and re-determine the first conflict resource set in accordance with the adjusted resource aware threshold.

In addition, the processor is further configured to read the computer program in the memory to: when the coordination information includes interference intensity information, adjust the resource coordination threshold, and re-determine the second conflict resource set in accordance with the adjusted resource coordination threshold; and when the coordination information does not include the interference intensity information, remove a part of resources from the second conflict resource set to obtain an updated second conflict resource set, and take the updated second conflict resource set as the re-determined second conflict resource set.

In addition, the quantity of the removed resources is determined in accordance with a preconfigured value and the quantity of resources indicated in the coordination information.

In addition, the predetermined requirement is that the quantity of resources in the remaining candidate resource set is greater than a product of a preset threshold and the quantity of resources in the initial candidate resource set.

In still yet another aspect, the present disclosure provides in some embodiments a resource processing device for a first UE, including a memory, a transceiver and a processor. The memory is configured to store therein a computer program. The transceiver is configured to receive and transmit data under the control of the processor. The processor is configured to read the computer program in the memory to: determine a first conflict resource set; perform resource exclusion in an initial candidate resource set in accordance with the first conflict resource set, to obtain a first candidate resource set; determine a second conflict resource set; perform resource exclusion in accordance with the first candidate resource set and the second conflict resource set, to obtain a second candidate resource set; and when the quantity of resources in the second candidate resource set does not meet a predetermined requirement, re-perform resource exclusion in the second candidate resource set. The first conflict resource set is determined in a resource aware manner, and the second conflict resource set is determined in accordance with coordination information received from a second UE; or the first conflict resource set is determined in accordance with the coordination information received from the second UE, and the second conflict resource set is determined in a resource aware manner.

In addition, the processor is further configured to read the computer program in the memory to: exclude the first conflict resource set in the initial candidate resource set to obtain the first candidate resource set; and when the quantity of resources in the first candidate resource set does not meet the predetermined requirement, adjust a resource aware threshold, re-determine the first conflict resource set in accordance with the adjusted resource aware threshold, and exclude the re-determined first conflict resource set in the initial candidate resource set, until the quantity of resources in the first candidate resource set meets the predetermined requirement.

In addition, the processor is further configured to read the computer program in the memory to determine the second conflict resource set in accordance with the coordination information and a resource coordination threshold.

In addition, the processor is further configured to read the computer program in the memory to, when the quantity of resources in the first candidate resource set meets the predetermined requirement, exclude the second conflict resource set in the first candidate resource set to obtain the second candidate resource set, or exclude an updated second conflict resource set in the first candidate resource set to obtain the second candidate resource set, wherein the updated second conflict resource set is obtained through removing a part of resources in the second conflict resource set.

In addition, the processor is further configured to read the computer program in the memory to: re-determine the second conflict resource set; and re-perform the resource exclusion in the first candidate resource set in accordance with the re-determined second conflict resource set.

In addition, the processor is further configured to read the computer program in the memory to: when the coordination information includes interference intensity information, adjust a resource coordination threshold, and re-determine the second conflict resource set in accordance with the adjusted resource coordination threshold; and when the coordination information does not include interference intensity information, remove a part of resources in the second conflict resource set to obtain an updated second conflict resource set, and take the updated second conflict resource set as the re-determined second conflict resource set.

In addition, the processor is further configured to read the computer program in the memory to, when the first conflict resource set is determined in accordance with the coordination information received from the second UE, the second conflict resource set is determined in a resource aware manner, and the coordination information includes the interference intensity information, determine the first conflict resource set in conflict resources indicated in the coordination information in accordance with the coordination information and/or a resource coordination threshold.

In addition, the processor is further configured to read the computer program in the memory to: exclude the first conflict resource set in the initial candidate resource set to obtain the first candidate resource set; and when the quantity of resources in the first candidate resource set does not meet the predetermined requirement, adjust the resource coordination threshold, re-determine the first conflict resource set in accordance with the adjusted resource coordination threshold, and exclude the re-determined first conflict resource set in the initial candidate resource set, until the quantity of resources in the first candidate resource set meets the predetermined requirement.

In addition, the processor is further configured to read the computer program in the memory to: when the first conflict resource set is determined in accordance with the coordination information received from the second UE, the second conflict resource set is determined in a resource aware manner and the coordination information does not include the interference intensity information, exclude the first conflict resource set in the initial candidate resource set to obtain the first candidate resource set, or exclude an updated first conflict resource set in the initial candidate resource set to obtain the first candidate resource set, wherein the updated first conflict resource set is obtained through removing a part of resources in the first conflict resource set; and when the quantity of resources in the first candidate resource set does not meet the predetermined requirement, remove a part of resources to obtain a re-determined first conflict resource set, and exclude the re-determined first conflict resource set in the initial candidate resource set, until the quantity of resources in the first candidate resource set meets the predetermined requirement.

In addition, the processor is further configured to read the computer program in the memory to, when the quantity of resources in the first candidate resource set meets the predetermined requirement, exclude the second conflict resource set in the first candidate resource set to obtain the second candidate resource set.

In addition, the processor is further configured to read the computer program in the memory to: re-determine the second conflict resource set; and re-perform the resource exclusion in the first candidate resource set in accordance with the re-determined second conflict resource set.

In addition, the processor is further configured to read the computer program in the memory to adjust a resource aware threshold, and re-determine the second conflict resource set in accordance with the adjusted resource aware threshold.

In addition, the predetermined requirement is that the quantity of resources in the second candidate resource set or the first candidate resource set is greater than a product of a preset threshold and the quantity of resources in the initial candidate resource set.

In addition, the quantity of the removed resources is determined in accordance with a preconfigured value and the quantity of conflict resources indicated in the coordination information.

In still yet another aspect, the present disclosure provides in some embodiments a resource processing device for a first UE, including: a first determination unit configured to determine a first conflict resource set in a resource aware manner; a second determination unit configured to determine a second conflict resource set, wherein the second conflict resource set is determined in accordance with coordination information from a second UE; a third determination unit configured to perform resource exclusion in an initial candidate resource set in accordance with the first conflict resource set and the second conflict resource set, to obtain a remaining candidate resource set; and a first processing unit configured to, when the quantity of resources in the remaining candidate resource set does not meet a predetermined requirement, re-perform resource exclusion in the initial candidate resource set.

In still yet another aspect, the present disclosure provides in some embodiments a resource processing device for a first UE, including: a first determination unit configured to determine a first conflict resource set; a first obtaining unit configured to perform resource exclusion in an initial candidate resource set in accordance with the first conflict resource set, to obtain a first candidate resource set; a second determination unit configured to determine a second conflict resource set; a second obtaining unit configured to perform resource exclusion in accordance with the first candidate resource set and the second conflict resource set, to obtain a second candidate resource set; and a first processing unit configured to, when the quantity of resources in the second candidate resource set does not meet a predetermined requirement, re-perform resource exclusion in the second candidate resource set. The first conflict resource set is determined in a resource aware manner, and the second conflict resource set is determined in accordance with coordination information received from a second UE; or the first conflict resource set is determined in accordance with the coordination information received from the second UE, and the second conflict resource set is determined in a resource aware manner.

In still yet another aspect, the present disclosure provides in some embodiments a readable storage medium storing therein a program. The program is executed by a processor so as to implement the steps of the above-mentioned resource processing method.

According to the embodiments of the present disclosure, when the first UE performs the resource exclusion, the first UE needs to take the conflict resources obtained in a resource aware manner and the conflict resources determined in accordance with the coordination information into consideration simultaneously. After the two parts of conflict resources have been excluded, when there are insufficient remaining candidate resources, the first UE re-performs the resource exclusion in the initial candidate resource set to obtain more candidate resources. As a result, it is able to obtain sufficient remaining candidate resources with taking both a resource aware result and a resource coordination result into consideration during the resource selection, thereby to reduce a probability of data packet loss due to resource collision, and increase a success rate of the transmission of the Sidelink data packet.

DETAILED DESCRIPTION

Figure 1:
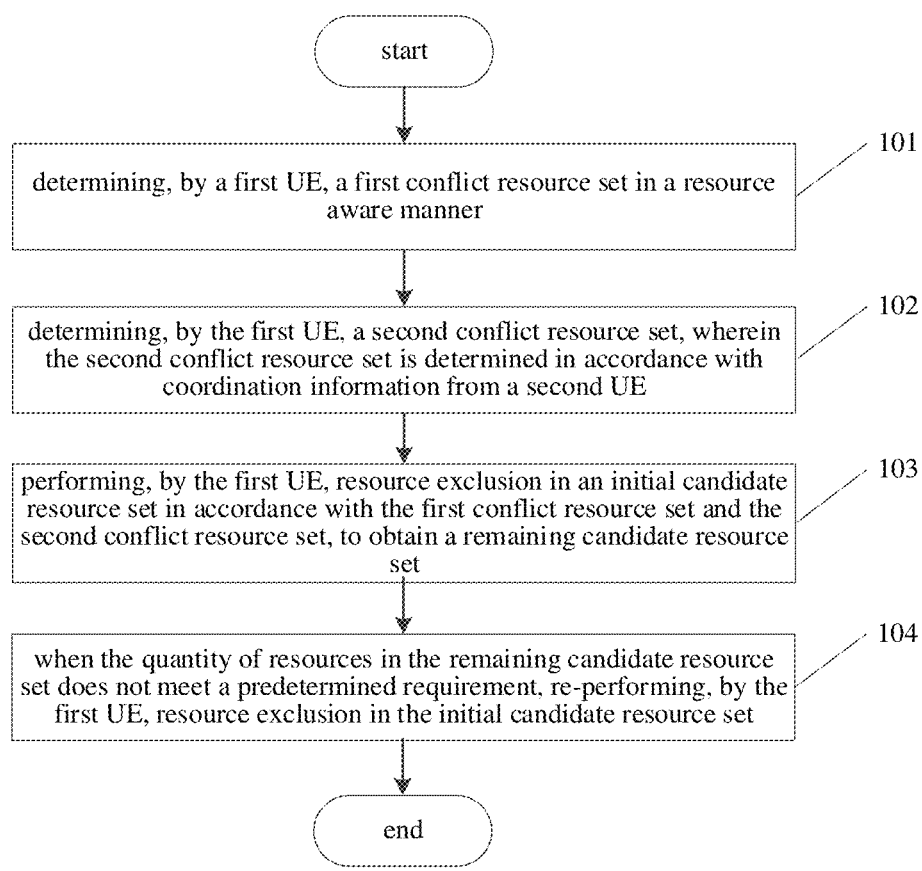
FIG. 1 is a flow chart of a resource processing method according to an embodiment of the present disclosure.

The expression "and/or" in the embodiments of the present disclosure may be merely used to describe the relationship between objects, and it may include three relationships. For example, "A and/or B" may represent that, there is only A, there are both A and B, and there is only B. Further, the symbol "/" usually refers to "or".

The expression "a plurality of" refers to two or more, and the other quantifiers are similar.

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide a resource processing method, a resource processing device and a readable storage medium, so as to increase a success rate of the transmission of a Sidelink data packet.

The method and the device are provided on the basis of a same inventive concept, and a principle of the method for solving the problem is similar to that of the device, so the implementation of the device may refer to that of the method.

Schemes in the embodiments of the present disclosure may be applied to various systems, especially a 5G system, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, or $5^{th}$-Generation (5G) New Radio (NR) system. Each of these systems includes a terminal device and a network device. Each system further includes a core network part, e.g., an Evolved Packet System (EPS) or 5G system (5GS).

The terminal involved in the embodiments of the present disclosure is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (UE). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be particularly defined herein.

As shown in FIG. 1, the present disclosure provides in some embodiments a resource processing method, which includes the following steps.

Step 101: determining, by a first UE, a first conflict resource set in a resource aware manner.

In the embodiments of the present disclosure, the resource aware manner refers to determining, by a UE, whether a resource is used by the other UE in accordance with the strength of the received signal (e.g., the strength of Reference Signal Receiving Power (RSRP)) on the resource. When the resource is used by the other UE, it is determined as a conflict resource. The first conflict resource set includes the conflict resources.

Step 102: determining, by the first UE, a second conflict resource set, wherein the second conflict resource set is determined in accordance with coordination information from a second UE.

To be specific, the first UE may receive the coordination information from the second UE, and determines the second conflict resource set in accordance with the coordination information.

In the embodiments of the present disclosure, the coordination information may include information about an interference resource and interference intensity information, e.g., RSRP information or an RSRP threshold.

When the coordination information does not include any interference intensity information, the first UE directly determines the second conflict resource set in accordance with the coordination information, e.g., randomly selects some resources in the conflict resources indicated in the coordination information to form the second conflict resource set. When the coordination information includes the interference intensity information, the first UE determines the second conflict resource set in the conflict resources indicated in the coordination information in accordance with the coordination information and/or a resource coordination threshold. To be specific, the first UE determines the second conflict resource set in the conflict resources indicated in the coordination information in accordance with the coordination information and the resource coordination threshold, or in accordance with the coordination information, or in accordance with the resource coordination threshold.

Step 103: performing, by the first UE, resource exclusion in an initial candidate resource set in accordance with the first conflict resource set and the second conflict resource set, to obtain a remaining candidate resource set.

To be specific, Step 103 includes: excluding, by the first UE, the first conflict resource set in the initial candidate resource set to obtain a first candidate resource set, and then, excluding, by the first UE, the second conflict resource set in the first candidate resource set to obtain a second candidate resource set as the remaining candidate resource set; or excluding, by the first UE, the second conflict resource set in the initial candidate resource set to obtain a third candidate resource set, and excluding, by the first UE, the first conflict resource set in the third candidate resource set to obtain a fourth candidate resource set as the remaining candidate resource set. Here, no matter whether the first conflict resource set or the second conflict resource set is excluded first, contents before the step are the same, and so do contents after the step.

In an embodiment of the present disclosure, the first UE excludes an updated second conflict resource set in the first candidate resource set to obtain the second candidate resource set, wherein the updated second conflict resource set is obtained through removing a part of resources in the second conflict resource set.

To be specific, when this step is performed for the first time, the first UE excludes the first conflict resource set in the initial candidate resource set to obtain the first candidate resource set. When this step is performed for the second time or more, the removal of resources in the second conflict resource set is involved in subsequent steps, so correspondingly, the second conflict resource set is updated accordingly. Hence, based on the second conflict resource set obtained previously, the first UE may exclude the second conflict resource set obtained previously, i.e., the updated second conflict resource set, in the first candidate resource set.

Step 104: when the quantity of resources in the remaining candidate resource set does not meet a predetermined requirement, re-performing, by the first UE, resource exclusion in the initial candidate resource set.

The predetermined requirement is that the quantity of resources in the remaining candidate resource set is greater than a product of a preset threshold and the quantity of resources in the initial candidate resource set. In other words, the first UE re-performs the resource exclusion in the initial candidate resource set when the following condition has been met: $N2<N1\times H1$, where N2 represents the quantity of resources in the second candidate resource set, N1 represents the quantity of resources in the initial candidate resource set, and H1 is the preset value greater than 0.

When the first UE re-performs the resource exclusion in the initial candidate resource set, the first UE re-determines at least one of the first conflict resource set or the second conflict resource set, and re-performs the resource exclusion in the initial candidate resource set in accordance with at least one of the re-determined first conflict resource set or the re-determined second conflict resource set.

To be specific, the re-determining, by the first UE, the first conflict resource set includes: adjusting, by the first UE, a resource aware threshold, and re-determining, by the first UE, the first conflict resource set in accordance with the adjusted resource aware threshold. The adjusting the resource aware threshold includes increasing or decreasing the resource aware threshold, and a value of the resource aware threshold in each adjustment may be adjusted according to the practical need, e.g., it is set as 3 db.

To be specific, the re-determining, by the first UE, the second conflict resource set includes: when the coordination information includes interference intensity information, adjusting, by the first UE, the resource coordination threshold, and re-determining, by the first UE, the second conflict resource set in accordance with the adjusted resource coordination threshold; and when the coordination information does not include the interference intensity information, removing, by the first UE, a part of resources from the second conflict resource set to obtain to obtain an updated second conflict resource set, and taking, by the first UE, the updated second conflict resource set as the re-determined second conflict resource set. The adjusting the resource aware threshold includes increasing or decreasing the resource aware threshold, and a value of the resource aware threshold in each adjustment may be adjusted according to the practical need, e.g., it is set as 3 db.

The quantity of the removed resources is determined in accordance with a preconfigured value and the quantity of resources indicated in the coordination information. In actual use, in the embodiments of the present disclosure, the quantity of the resources removed each time is determined through $M=K\times Y$, where M represents the quantity of the removed resources, K represents the quantity of conflict resources indicated in the coordination information, Y represents the preconfigured value, and M, K and Y are each greater than 0.

Based on the above, in an embodiment of the present disclosure, the remaining candidate resource set is obtained through Steps 101 to 103. When the quantity of resources in the remaining candidate resource set does not meet the predetermined requirement, the resource aware threshold is adjusted, and then the first conflict resource set is re-determined in accordance with the adjusted resource aware threshold. In other words, after the adjustment of the resource aware threshold, the remaining candidate resource set may be obtained again through Steps 101 to 103, and then Step 104 is performed again. When the predetermined requirement has been met, the first UE selects resources in the remaining candidate resource set for the Sidelink communication. In actual use, when the above procedure is performed for many times but the predetermined requirement is still not met, the process may be ended, e.g., when a resource scheduling delay exceeds a predetermined maximum delay threshold. The predetermined maximum delay threshold may be set according to the practical need.

Based on the above, in an embodiment of the present disclosure, when the coordination information includes the interference intensity information, the remaining candidate resource set is obtained through Steps 101 to 103. When the quantity of resources in the remaining candidate resource set does not meet the predetermined requirement, the resource aware threshold and the resource coordination threshold are adjusted, and the first conflict resource set and the second conflict resource set are re-determined in accordance with the adjusted resource aware threshold and the adjusted resource coordination threshold. In other words, after the adjustment of the resource aware threshold and the resource coordination threshold, the remaining candidate resource set is obtained again through Steps 101 to 103, and then Step 104 is performed again. When the predetermined requirement has been met, the first UE selects resources in the remaining candidate resource set for the Sidelink communication. In actual use, when the above procedure is performed for many times but the predetermined requirement is still not met, the process may be ended, e.g., when a resource scheduling delay exceeds a predetermined maximum delay threshold. The predetermined maximum delay threshold may be set according to the practical need.

Based on the above, in an embodiment of the present disclosure, when the coordination information does not include any interference intensity information, the remaining candidate resource set is obtained through Steps 101 to 103. When the quantity of resources in the remaining candidate resource set does not meet the predetermined requirement, the resource aware threshold is adjusted, and then a part of resources are removed in the second conflict resource set. In other words, after the adjustment of the resource aware threshold and the removal of a part of resources, the remaining candidate resource set is obtained again through Steps 101 to 103, and then Step 104 is performed again. When the predetermined requirement has been met, the first UE selects resources in the remaining candidate resource set for the Sidelink communication. In actual use, when the above procedure is performed for many times but the predetermined requirement is still not met, the process may be ended, e.g., when a resource scheduling delay exceeds a predetermined maximum delay threshold. The predetermined maximum delay threshold may be set according to the practical need.

It should be appreciated that, in the embodiments of the present disclosure, when the resource aware threshold and the resource coordination threshold are subjected to be adjusted, adjustment values of the resource aware threshold and the resource coordination threshold may be the same or different. Apart from those mentioned hereinabove, the adjustment of the resource aware threshold and the resource coordination threshold may also be stopped when the resource scheduling delay exceeds the predetermined maximum delay threshold. In other words, when the quantity of resources in the remaining candidate resource set does not meet the predetermined requirement but the resource scheduling delay exceeds the predetermined maximum delay threshold, the procedure in the embodiments of the present disclosure is stopped.

According to the embodiments of the present disclosure, when the first UE performs the resource exclusion, the first UE needs to take both the conflict resources obtained in a resource aware manner and the conflict resources determined in accordance with the coordination information into consideration simultaneously. After the two parts of conflict resources have been excluded, when it finds that there are insufficient remaining candidate resources, the first UE re-performs the resource exclusion in the initial candidate resource set, until sufficient remaining candidate resources are obtained. As a result, it is able to obtain sufficient remaining candidate resources with taking both a resource aware result and a resource coordination result into consideration during the resource selection, thereby to reduce a probability of data packet loss due to a resource conflict, and increase a success rate of the transmission of the Sidelink data packet.

Figure 2:
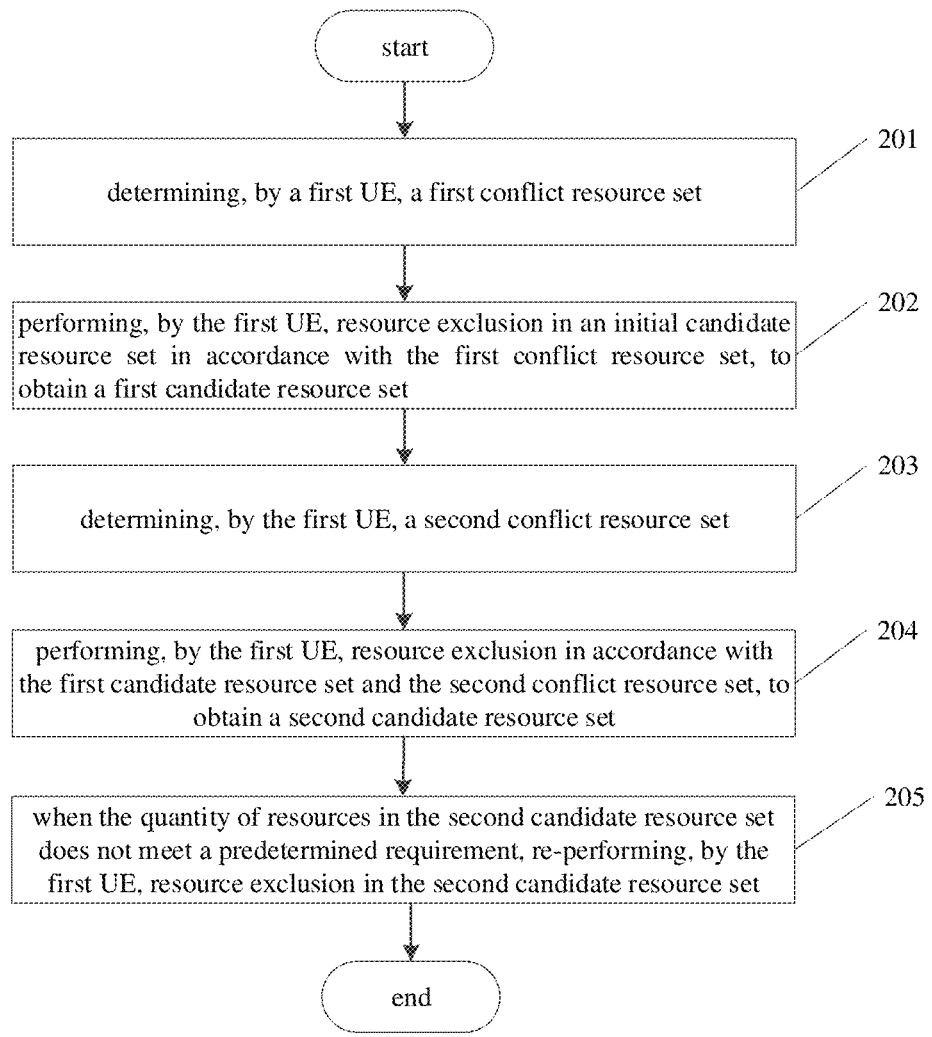
FIG. 2 is another flow chart of the resource processing method according to an embodiment of the present disclosure.

As shown in FIG. 2, the present disclosure further provides in some embodiments a resource processing method, which includes: Step 201 of determining, by a first UE, a first conflict resource set; Step 202 of performing, by the first UE, resource exclusion in an initial candidate resource set in accordance with the first conflict resource set, to obtain a first candidate resource set; Step 203 of determining, by the first UE, a second conflict resource set; Step 204 of performing, by the first UE, resource exclusion in accordance with the first candidate resource set and the second conflict resource set, to obtain a second candidate resource set; and Step 205 of, when the quantity of resources in the second candidate resource set does not meet a predetermined requirement, re-performing, by the first UE, resource exclusion in the second candidate resource set. The first conflict resource set is determined in a resource aware manner, and the second conflict resource set is determined in accordance with coordination information received from a second UE; or the first conflict resource set is determined in accordance with the coordination information received from the second UE, and the second conflict resource set is determined in a resource aware manner.

1. The first conflict resource set is determined in a resource aware manner, and the second conflict resource set is determined in accordance with the coordination information received from the second UE.

(1). In the embodiments of the present disclosure, in Step 201, the first UE determines the first conflict resource set in a resource aware manner.

Step 202 specifically includes: performing, by the first UE, the resource exclusion in the initial candidate resource set in accordance with the first conflict resource set to obtain the first candidate resource set; and then when the quantity of resources in the first candidate resource set does not meet the predetermined requirement, adjusting, by the first UE, a resource aware threshold, re-determining, by the first UE, the first conflict resource set in accordance with the adjusted resource aware threshold, and excluding, by the first UE, the re-determined first conflict resource set in the initial candidate resource set, until the quantity of resources in the first candidate resource set meets the predetermined requirement.

The predetermined requirement is that the quantity of resources in the first candidate resource set is greater than a product of a preset threshold and the quantity of resources in the initial candidate resource set.

In other words, the first UE adjusts the resource aware threshold, re-determines the first conflict resource set in accordance with the adjusted resource aware threshold, and excludes the re-determined first conflict resource set in the initial candidate resource set when the following condition has been met: $N3<N1\times H1$, where N3 represents the quantity of resources in the first candidate resource set, N1 represents the quantity of resources in the initial candidate resource set, and H1 is the preconfigured value greater than 0.

For example, the first UE increases or decreases the resource aware threshold by 3 db, and re-determines the first conflict resource set in accordance with the increased or decreased resource aware threshold.

In the embodiments of the present disclosure, when the coordination information includes the interference intensity information, Step 203 specifically includes determining, by the first UE, the second conflict resource set in accordance with the coordination information and a resource coordination threshold.

Step 204 specifically includes, when the quantity of resources in the first candidate resource set in Step 202 meets the predetermined requirement, excluding, by the first UE, the second conflict resource set in the first candidate resource set to obtain the second candidate resource set.

In Step 205, when the quantity of resources in the second candidate resource set in Step 202 does not meet the predetermined requirement, the first UE re-determines the second conflict resource set, and re-performs the resource exclusion in the first candidate resource set in accordance with the re-determined second conflict resource set.

To be specific, the first UE adjusts a resource coordination threshold, and re-determines the second conflict resource set in accordance with the adjusted resource coordination threshold. For example, the first UE increases or decreases the resource coordination threshold by 3 db.

In this step, the predetermined requirement is that the quantity of resources in the second candidate resource set is greater than a product of a preset threshold and the quantity of resources in the initial candidate resource set. In other words, the first UE re-determines the second conflict resource set and re-performs the resource exclusion in the first candidate resource set in accordance with the re-determined second conflict resource set when the following condition has been met: $N4<N1\times H1$, where N4 represents the quantity of resources in the second candidate resource set, N1 represents the quantity of resources in the initial candidate resource set, and H1 represents the preconfigured value greater than 0.

In Step 202, when the quantity of resources in the first candidate resource set meets the predetermined requirement, Step 203 is to be performed. Otherwise, the first candidate resource set is re-determined. When the first candidate resource set is re-determined for many times but the quantity of resources in the first candidate resource set still does not meet the predetermined requirement, the process is ended, or when the resource scheduling delay exceeds the predetermined maximum delay threshold for example, the process is ended. Identically, in Step 205, when the quantity of resources in the second candidate resource set meets the predetermined requirement, the resources are selected in the remaining candidate resource set for the Sidelink communication. Otherwise, the second candidate resource set is re-determined. When the second candidate resource set is re-determined for many times but the quantity of resources in the second candidate resource set still does not meet the predetermined requirement, the process is ended, or when the resource scheduling delay exceeds the predetermined maximum delay threshold for example, the process is ended.

(2). In the embodiments of the present disclosure, in Step 201, the first UE determines the first conflict resource set in a resource aware manner.

Step 202 specifically includes: excluding, by the first UE, the first conflict resource set in the initial candidate resource set to obtain the first candidate resource set; and when the quantity of resources in the first candidate resource set does not meet the predetermined requirement, adjusting, by the first UE, the resource coordination threshold, re-determining, by the first UE, the first conflict resource set in accordance with the adjusted resource coordination threshold, and excluding, by the first UE, the re-determined first conflict resource set in the initial candidate resource set, until the quantity of resources in the first candidate resource set meets the predetermined requirement. The predetermined requirement is that the quantity of resources in the first candidate resource set is greater than a product of a preset threshold and the quantity of resources in the initial candidate resource set. In other words, the first UE adjusts the resource aware threshold, re-determines the first conflict resource set in accordance with the adjusted resource aware threshold, and excludes the re-determined first conflict resource set in the initial candidate resource set when the following condition has been met: $N3<N1\times H1$, where N3 represents the quantity of resources in the first candidate resource set, N1 represents the quantity of resources in the initial candidate resource set, and H1 represents the preconfigured value greater than 0.

For example, the first UE increases or decreases the resource aware threshold by 3 db, and re-determines the first conflict resource set in accordance with the increased or decreased resource aware threshold.

In the embodiments of the present disclosure, when the coordination information does not include the interference intensity information, Step 203 specifically includes determining, by the first UE, the second conflict resource set directly in accordance with the coordination information.

Step 204 specifically includes: when the quantity of resources in the first candidate resource set in Step 202 meets the predetermined requirement, excluding, by the first UE, the second conflict resource set in the first candidate resource set to obtain the second candidate resource set, or excluding, by the first UE, an updated second conflict resource set in the first candidate resource set to obtain the second candidate resource set, the updated second conflict resource set being obtained through removing a part of resources in the second conflict resource set.

When the method in the embodiments of the present disclosure is performed for the first time, in this step, the second conflict resource set is excluded in the first candidate resource set to obtain the second candidate resource set. When the method in the embodiments of the present disclosure is performed for the second time or more, the exclusion of the resources in the second conflict resource set is involved subsequently, so in this step, the first UE excludes the updated second conflict resource set in the first candidate resource set to obtain the second candidate resource set.

In Step 205, when the quantity of resources in the second candidate resource set does not meet the predetermined requirement, the first UE re-determines the second conflict resource set, and re-performs the resource exclusion in the first candidate resource set in accordance with the re-determined second conflict resource set. To be specific, the first UE removes a part of resources in the second conflict resource set to obtain the updated second conflict resource set, and takes the updated second conflict resource set as the re-determined second conflict resource set. In this step, the predetermined requirement is that the quantity of resources in the second candidate resource set is greater than a product of a preset threshold and the quantity of resources in the initial candidate resource set.

In other words, the first UE re-determines the second conflict resource set, and re-performs the resource exclusion in the first candidate resource set in accordance with the re-determined second conflict resource set when the following condition has been met: N4<N1×H1, where N4 represents the quantity of resources in the second candidate resource set, N1 represents the quantity of resources in the initial candidate resource set, and H1 represents the preconfigured value greater than 0.

In Step 202, when the quantity of resources in the first candidate resource set meets the predetermined requirement, Step 203 is to be performed. Otherwise, the first candidate resource set is re-determined. When the first candidate resource set is re-determined for many times but the quantity of resources in the first candidate resource set still does not meet the predetermined requirement, the process is ended, or when the resource scheduling delay exceeds the predetermined maximum delay threshold, the process is ended. Identically, in Step 205, when the quantity of resources in the second candidate resource set meets the predetermined requirement, the resources are selected in the remaining candidate resource set for the Sidelink communication. Otherwise, the second candidate resource set is re-determined. When the second candidate resource set is re-determined for many times but the quantity of resources in the second candidate resource set still does not meet the predetermined requirement, the process is ended, or when the resource scheduling delay exceeds the predetermined maximum delay threshold, the process is ended.

2. The first conflict resource set is determined in accordance with the coordination information received from the second UE, and the second conflict resource set is determined in a resource aware manner.

(1) In the embodiments of the present disclosure, when the coordination information includes the interference intensity information, Step 201 specifically includes determining, by the first UE, the first conflict resource set in the conflict resources indicated in the coordination information in accordance with the coordination information and/or resource coordination threshold.

Step 202 specifically includes: excluding, by the first UE, the first conflict resource set in the initial candidate resource set to obtain the first candidate resource set; and when the quantity of resources in the first candidate resource set does not meet the predetermined requirement, adjusting, by the first UE, a coordination aware threshold, re-determine the first conflict resource set in accordance with the adjusted coordination aware threshold, and exclude the re-determined first conflict resource set in the initial candidate resource set, until the quantity of resources in the first candidate resource set meets the predetermined requirement.

The predetermined requirement is that the quantity of resources in the first candidate resource set is greater than a product of a preset threshold and the quantity of resources in the initial candidate resource set. In other words, the first UE increases or decreases the resource coordination threshold and re-determines the first conflict resource set in accordance with the coordination information and the increased or decreased resource coordination threshold when the following condition has been met: N3<N1×H1, where N3 represents the quantity of resources in the first candidate resource set, N1 represents the quantity of resources in the initial candidate resource set, and H1 represents the preconfigured value greater than 0.

In Step 203, the first UE determines the second conflict resource set in a resource aware manner.

Step 204 specifically includes, when the quantity of resources in the first candidate resource set meets the predetermined requirement, excluding, by the first UE, the second conflict resource set in the first candidate resource set to obtain the second candidate resource set.

In Step 205, when the quantity of resources in the second candidate resource set does not meet the predetermined requirement, the first UE re-determines the second conflict resource set, and re-performs the resource exclusion in the first candidate resource set in accordance with the re-determined second conflict resource set.

In this step, the predetermined requirement is that the quantity of resources in the second candidate resource set is greater than a product of a preset threshold and the quantity of resources in the initial candidate resource set. To be specific, the first UE adjusts the resource aware threshold, and re-determines the second conflict resource set in accordance with the adjusted resource aware threshold.

In other words, the first UE increases or decreases the resource aware threshold, and re-determines the second conflict resource set in accordance with the increased or decreased resource aware threshold when the following condition has been met: N4<N1×H1, where N4 represents the quantity of resources in the second candidate resource set, N1 represents the quantity of resources in the initial candidate resource set, and H1 represents the preconfigured value greater than 0.

(2) In the embodiments of the present disclosure, when the coordination information does not include the interference intensity information, Step 201 specifically includes determining, by the first UE, the first conflict resource set in accordance with the coordination information.

Step 202 specifically includes: excluding, by the first UE, the first conflict resource set in the initial candidate resource set to obtain the first candidate resource set, or excluding, by the first UE, an updated first conflict resource set in the initial candidate resource set to obtain the first candidate resource set, wherein the updated first conflict resource set is obtained through removing a part of resources in the first conflict resource set; and when the quantity of resources in the first candidate resource set does not meet the predetermined requirement, removing, by the first UE, a part of resources to obtain a re-determined first conflict resource set, and excluding, by the first UE, the re-determined first conflict resource set in the initial candidate resource set, until the quantity of resources in the first candidate resource set meets the predetermined requirement.

When the method in the embodiments of the present disclosure is performed for the first time, in this step, the first conflict resource set is excluded in the first candidate resource set to obtain the first candidate resource set. When the method in the embodiments of the present disclosure is performed for the second time or more, the exclusion of the resources in the first conflict resource set is involved subsequently, so in this step, the first UE excludes the updated first conflict resource set in the initial candidate resource set to obtain the first candidate resource set.

The predetermined requirement is that the quantity of resources in the first candidate resource set is greater than a product of a preset threshold and the quantity of resources in the initial candidate resource set. In other words, the first UE re-determines the first conflict resource set when the following condition has been met: N3<N1×H1, where N3 represents the quantity of resources in the first candidate resource set, N1 represents the quantity of resources in the initial candidate resource set, and H1 represents the preconfigured value greater than 0.

In Step 203, the first UE determines the second conflict resource set in a resource aware manner.

In Step 204, when the quantity of resources in the first candidate resource set meets the predetermined requirement, the first UE excludes the second conflict resource set in the first candidate resource set to obtain the second candidate resource set.

In Step 205, when the quantity of resources in the second candidate resource set does not meet the predetermined requirement, the first UE re-determines the second conflict resource set, and re-performs the resource exclusion in the first candidate resource set in accordance with the re-determined second conflict resource set.

The predetermined requirement is that the quantity of resources in the second candidate resource set is greater than a product of a preset threshold and the quantity of resources in the initial candidate resource set. To be specific, the first UE adjusts the resource aware threshold, and re-determines the second conflict resource set in accordance with the adjusted resource aware threshold. In other words, the first UE increases or decreases the resource aware threshold and re-determines the second conflict resource set in accordance with the increased or decreased resource aware threshold when the following condition has been met: N4<N1×H1, where N4 represents the quantity of resources in the second candidate resource set, N1 represents the quantity of resources in the initial candidate resource set, and H1 represents the preconfigured value greater than 0.

In Step 202, when the quantity of resources in the first candidate resource set meets the predetermined requirement, Step 203 is to be performed. Otherwise, the first candidate resource set is re-determined. When the first candidate resource set is re-determined for many times but the quantity of resources in the first candidate resource set still does not meet the predetermined requirement, the process is ended, or when the resource scheduling delay exceeds the predetermined maximum delay threshold, the process is ended. Identically, in Step 205, when the quantity of resources in the second candidate resource set meets the predetermined requirement, the resources are selected in the remaining candidate resource set for the Sidelink communication. Otherwise, the second candidate resource set is re-determined. When the second candidate resource set is re-determined for many times but the quantity of resources in the second candidate resource set still does not meet the predetermined requirement, the process is ended, or when the resource scheduling delay exceeds the predetermined maximum delay threshold, the process is ended.

In the embodiments of the present disclosure, the quantity of removed resources is determined in accordance with a preconfigured value and the quantity of conflict resources indicated in the coordination information. In actual use, in the embodiments of the present disclosure, the quantity of resources removed each time is determined through M=K×Y, where M represents the quantity of the removed resources, K represents the quantity of conflict resources indicated in the coordination information, Y represents the preconfigured value, and M, K and Y are each greater than 0.

It should be appreciated that, in the embodiments of the present disclosure, when the resource aware threshold and the resource coordination threshold are subjected to be adjusted, adjustment values of the resource aware threshold and the resource coordination threshold may be the same or different.

According to the embodiments of the present disclosure, when the first UE performs the resource exclusion, the first UE needs to take both the conflict resources obtained in a resource aware manner and the conflict resources determined in accordance with the coordination information into consideration simultaneously. After the two parts of conflict resources have been excluded, when there are insufficient remaining candidate resources, the first UE re-performs the resource exclusion in the initial candidate resource set, until sufficient remaining candidate resources are obtained. As a result, it is able to obtain sufficient remaining candidate resources with taking both a resource aware result and a resource coordination result into consideration during the resource selection, thereby to reduce a probability of data packet loss due to a resource conflict, and increase a success rate of the transmission of the Sidelink data packet.

Figure 3:
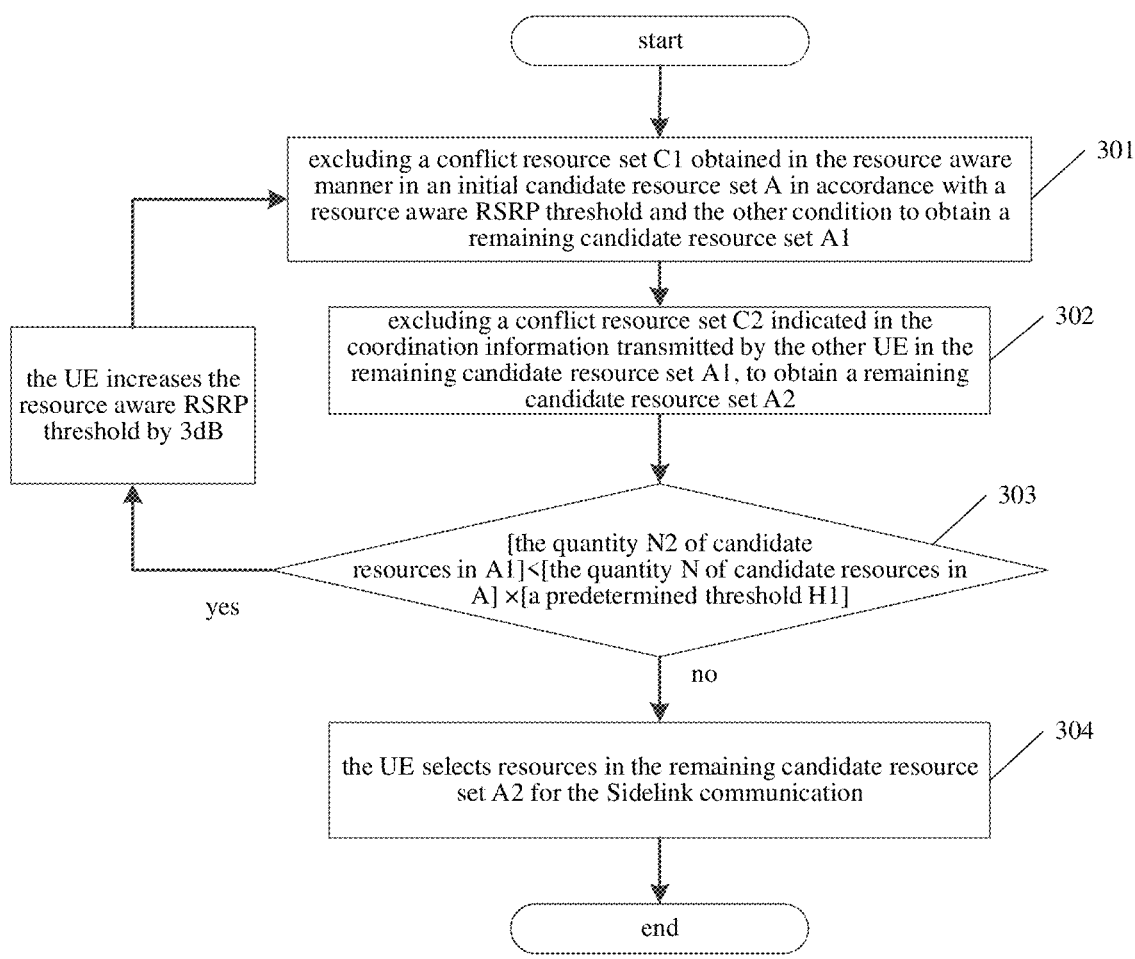
FIG. 3 is yet another flow chart of the resource processing method according to an embodiment of the present disclosure.

In an embodiment of the present disclosure, after performing the resource exclusion in a resource aware manner and performing the resource exclusion in accordance with the coordination information, when it finds that there are insufficient remaining resources, the resource aware threshold is increased or decreased, and then the resource exclusion is re-performed until sufficient resources are obtained. As shown in FIG. 3, when the initial candidate resource set for a UE is A, the resource processing method in the embodiments of the present disclosure includes the following steps.

Step 301: the UE excludes a conflict resource set C1 obtained in the resource aware manner in the initial candidate resource set A in accordance with a resource aware RSRP threshold and the other condition (e.g., a priority level of a data packet or a user), to obtain a remaining candidate resource set A1.

Step 302: the UE excludes a conflict resource set C2 in the coordination information transmitted by the other UE in the remaining candidate resource set A1, to obtain a remaining candidate resource set A2.

Step 303: when the quantity of candidate resources in the remaining candidate resource set A2 meets a formula (1), i.e., [the quantity N2 of candidate resources in A2]<[the quantity N of candidate resources in A]×[a predetermined threshold H1], the UE increases the resource aware RSRP threshold by 3 db, and returns to Step 301 so as to re-perform the resource exclusion in the initial candidate resource set A. When the quantity N2 of candidate resources in the remaining candidate resource set A2 does not meet (1), the UE proceeds to Step 304. The predetermined threshold H1 is a preconfigured value.

Step 304: the UE selects resources in the remaining candidate resource set A2 for the Sidelink communication.

Based on the above-mentioned resource processing method, after performing the resource exclusion in a resource aware manner and performing the resource exclusion in accordance with the coordination information, when it finds that there are insufficient remaining resources, it is merely necessary to adjust the resource aware threshold to re-perform the resource exclusion in the initial candidate resource set A. Hence, the scheme is simple with few influence on a protocol.

In an embodiment of the present disclosure, after performing the resource exclusion in a resource aware manner and performing the resource exclusion in accordance with the coordination information, when it finds that there are insufficient remaining resources, the resource aware threshold and the resource coordination threshold are increased or decreased, and then the resource exclusion is re-performed until sufficient resources are obtained.

A mode for determining a conflict resource set C2 depends on whether the coordination information includes the interference intensity information. When the coordination information includes the interference intensity information, the conflict resource set C2 in the coordination information transmitted by the other UE is determined in accordance with the coordination information and the resource coordination threshold. When the coordination information does not include the interference intensity information, the conflict resource set C2 is formed through randomly selecting the conflict resources in the coordination information transmitted by the other UE.

Figure 4:
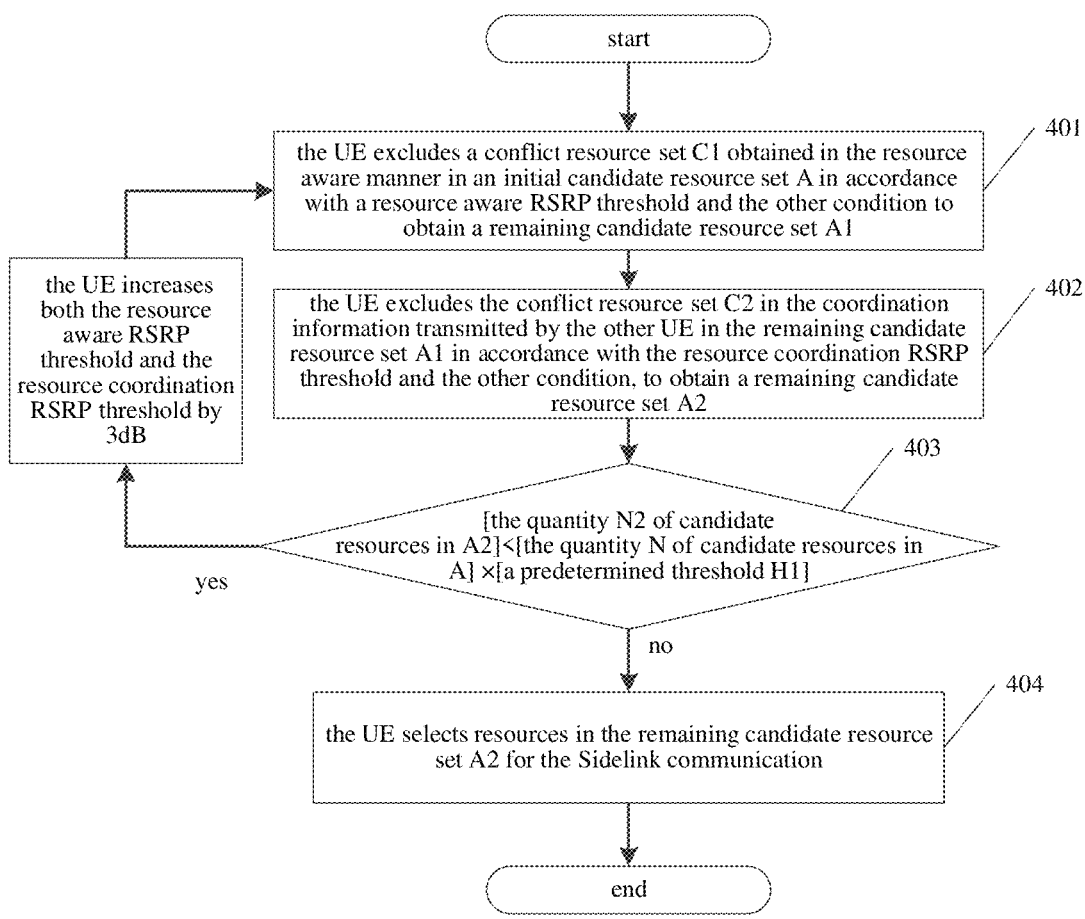
FIG. 4 is still yet another flow chart of the resource processing method according to an embodiment of the present disclosure.

As shown in FIG. 4, when an initial candidate resource set for a UE is A and the coordination information includes the interference information, the resource processing method in the embodiments of the present disclosure includes the following steps.

Step 401: the UE excludes a conflict resource set C1 obtained in the resource aware manner in the initial candidate resource set A in accordance with a resource aware RSRP threshold and the other condition (e.g., a priority level of a data packet or a user), to obtain a remaining candidate resource set A1.

Step 402: the UE excludes the conflict resource set C2 in the coordination information transmitted by the other UE in the remaining candidate resource set A1 in accordance with the resource coordination threshold and the other condition (e.g., a priority level of a data packet or a user), to obtain a remaining candidate resource set A2.

Step 403: when the quantity of candidate resources in the remaining candidate resource set A2 meets a formula (2), i.e., [the quantity N2 of candidate resources in A2]<[the quantity N of candidate resources in A]×[a predetermined threshold H1], the UE increases the resource aware RSRP threshold and the resource coordination RSRP threshold by 3 db, and returns to Step 401 so as to re-perform the resource exclusion in the initial candidate resource set A. When the quantity N2 of candidate resources in the remaining candidate resource set A2 does not meet (2), the UE proceeds to Step 404. The predetermined threshold H1 is a preconfigured value.

Step 404: the UE selects resources in the remaining candidate resource set A2 for the Sidelink communication.

Based on the above-mentioned resource processing method, after performing the resource exclusion in a resource aware manner and performing the resource exclusion in accordance with the coordination information, when it finds that there are insufficient remaining resources, it is merely necessary to adjust the resource aware threshold and the resource coordination threshold to re-perform the resource exclusion in the initial candidate resource set A. Hence, the scheme is flexible and it is able to selectively exclude the coordination resources.

Figure 5:
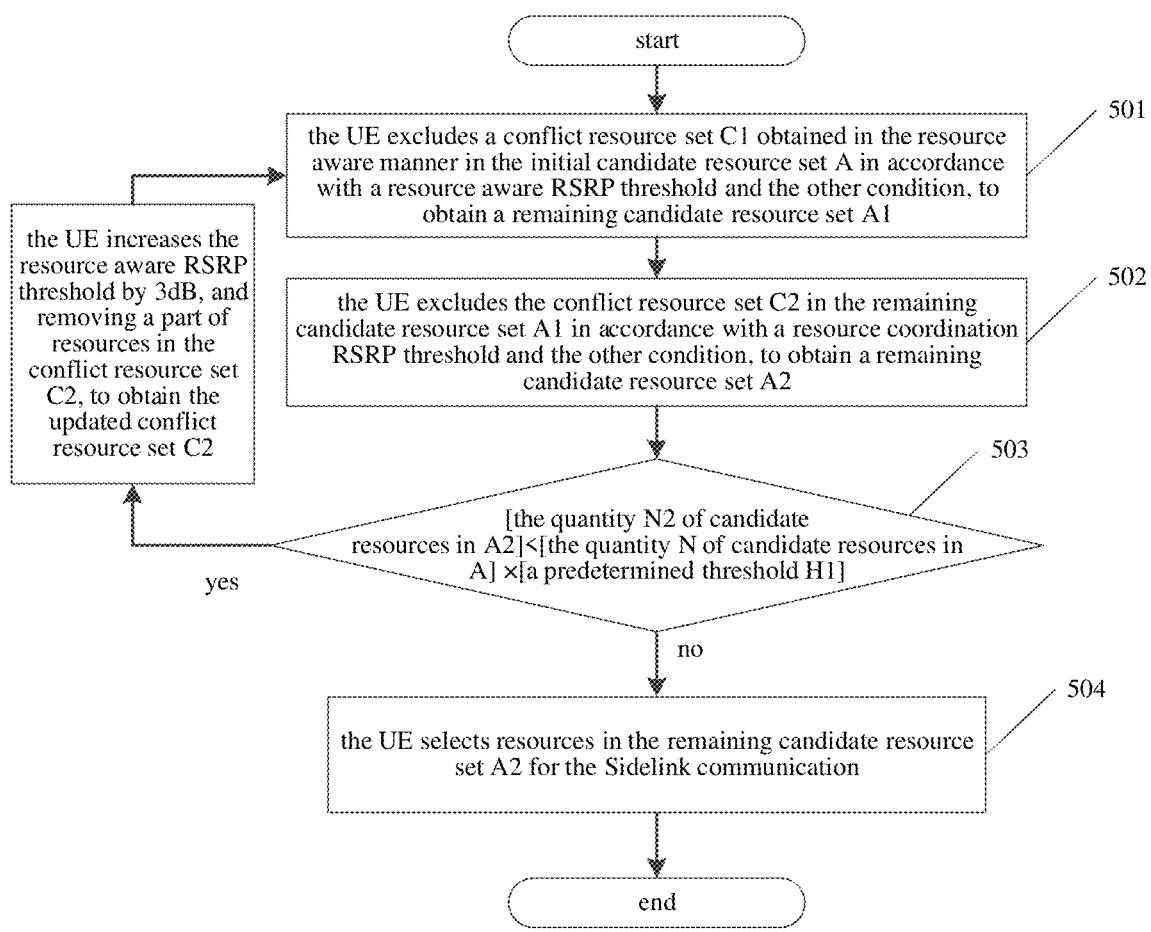
FIG. 5 is still yet another flow chart of the resource processing method according to an embodiment of the present disclosure.

As shown in FIG. 5, when an initial candidate resource set for a UE is A and the coordination information does not include the interference information, the resource processing method in the embodiments of the present disclosure includes the following steps.

Step 501: the UE excludes a conflict resource set C1 obtained in the resource aware manner in the initial candidate resource set A in accordance with a resource aware RSRP threshold and the other condition (e.g., a priority level of a data packet or a user), to obtain a remaining candidate resource set A1.

Step 502: the UE excludes the conflict resource set C2 in the remaining candidate resource set A1, to obtain a remaining candidate resource set A2.

When the resource exclusion is performed for the first time, the conflict resource set C2 in the coordination information transmitted by the other UE is directly excluded, and when the resource exclusion is performed for an $n^{th}$ time (n≥2), the updated conflict resource set C2 obtained through an $(n-1)^{th}$ updating process is excluded.

Step 503: when the quantity of candidate resources in the remaining candidate resource set A2 meets a formula (3), i.e., [the quantity N2 of candidate resources in A2]<[the quantity N of candidate resources in A]×[a predetermined threshold H1] (3), the UE increases the resource aware RSRP threshold by 3 db, removes a part of resources in the conflict resource set C2 to obtain the updated conflict resource set C2, and returns to Step 501 so as to re-perform the resource exclusion in the initial candidate resource set A. When the quantity N2 of candidate resources in the remaining candidate resource set A2 does not meet the formula (3), the UE proceeds to Step 504. The predetermined threshold H1 is a preconfigured value.

Step 504: the UE selects resources in the remaining candidate resource set A2 for the Sidelink communication.

Based on the above-mentioned resource processing method, after performing the resource exclusion in a resource aware manner and performing the resource exclusion in accordance with the coordination information, when it finds that there are insufficient remaining resources, it is merely necessary to adjust the resource aware threshold and remove a part of resources in the conflict resource set C2 to re-perform the resource exclusion in the initial candidate resource set A. Hence, the scheme is flexible and it is able to selectively exclude the coordination resources.

In an embodiment of the present disclosure, the resource exclusion is performed at first in a resource aware manner; when there are insufficient resources after the resource exclusion, the resource aware threshold is increased to re-perform the resource exclusion; when the quantity of resources meets the predetermined requirement after the resource exclusion, the resource exclusion is performed in accordance with the coordination information; and when there are insufficient resources after the resource exclusion performed in accordance with the coordination information, the resource coordination threshold is increased to re-perform the resource exclusion until sufficient resources are obtained.

A mode for determining a conflict resource set C2 depends on whether the coordination information includes the interference intensity information. When the coordination information includes the interference intensity information, the conflict resource set C2 in the coordination information transmitted by the other UE is determined in accordance with the coordination information and the resource coordination threshold. When the coordination information does not include the interference intensity information, the conflict resource set C2 is formed through randomly selecting the conflict resources in the coordination information transmitted by the other UE.

Figure 6:
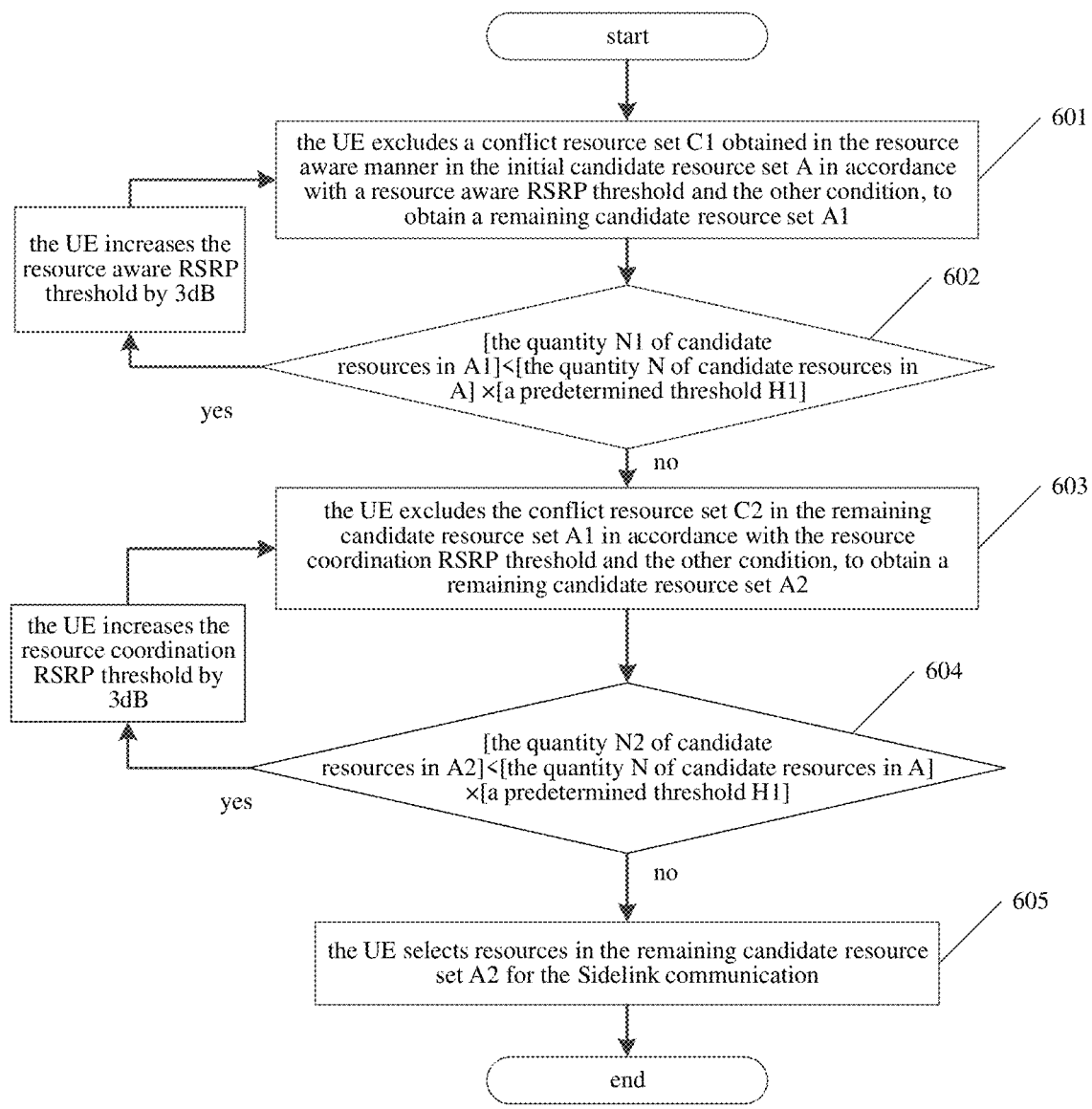
FIG. 6 is still yet another flow chart of the resource processing method according to an embodiment of the present disclosure.

As shown in FIG. 6, when an initial candidate resource set for a UE is A and the coordination information includes the interference information, the resource processing method in the embodiments of the present disclosure includes the following steps.

Step 601: the UE excludes a conflict resource set C1 in the initial candidate resource set A in accordance with a resource aware RSRP threshold and the other condition (e.g., a priority level of a data packet or a user), to obtain a remaining candidate resource set A1.

Step 602: when the quantity of candidate resources in the remaining candidate resource set A1 meets a formula (4), i.e., [the quantity N1 of candidate resources in A1]<[the quantity N of candidate resources in A]×[a predetermined threshold H1], the UE increases the resource aware RSRP threshold by 3 db, and returns to Step 601 so as to re-perform the resource exclusion in the initial candidate resource set A. When the quantity of candidate resources in the remaining candidate resource set A1 does not meet the formula (4), the UE proceeds to Step 603. The predetermined threshold H1 is a preconfigured value.

Step 603: the UE excludes the conflict resource set C2 in the coordination information transmitted by the other UE from the remaining candidate resource set A1 in accordance with the resource coordination RSRP threshold and the other condition (e.g., a priority level of a data packet or a user), to obtain a remaining candidate resource set A2.

Step 604: when the quantity of candidate resources in the remaining candidate resource set A2 meets a formula (5), i.e., [the quantity N2 of candidate resources in A2]<[the quantity N of candidate resources in A]×[a predetermined threshold H1], the UE increases the resource coordination RSRP threshold by 3 db, and returns to Step 603 so as to re-perform the resource exclusion in the remaining candidate resource set A1. The predetermined threshold H1 is a preconfigured value. When the quantity N2 of candidate resources in the remaining candidate resource set A2 does not meet (5), the UE proceeds to Step 605.

Step 605: the UE selects resources in the remaining candidate resource set A2 for the Sidelink communication.

Figure 7:
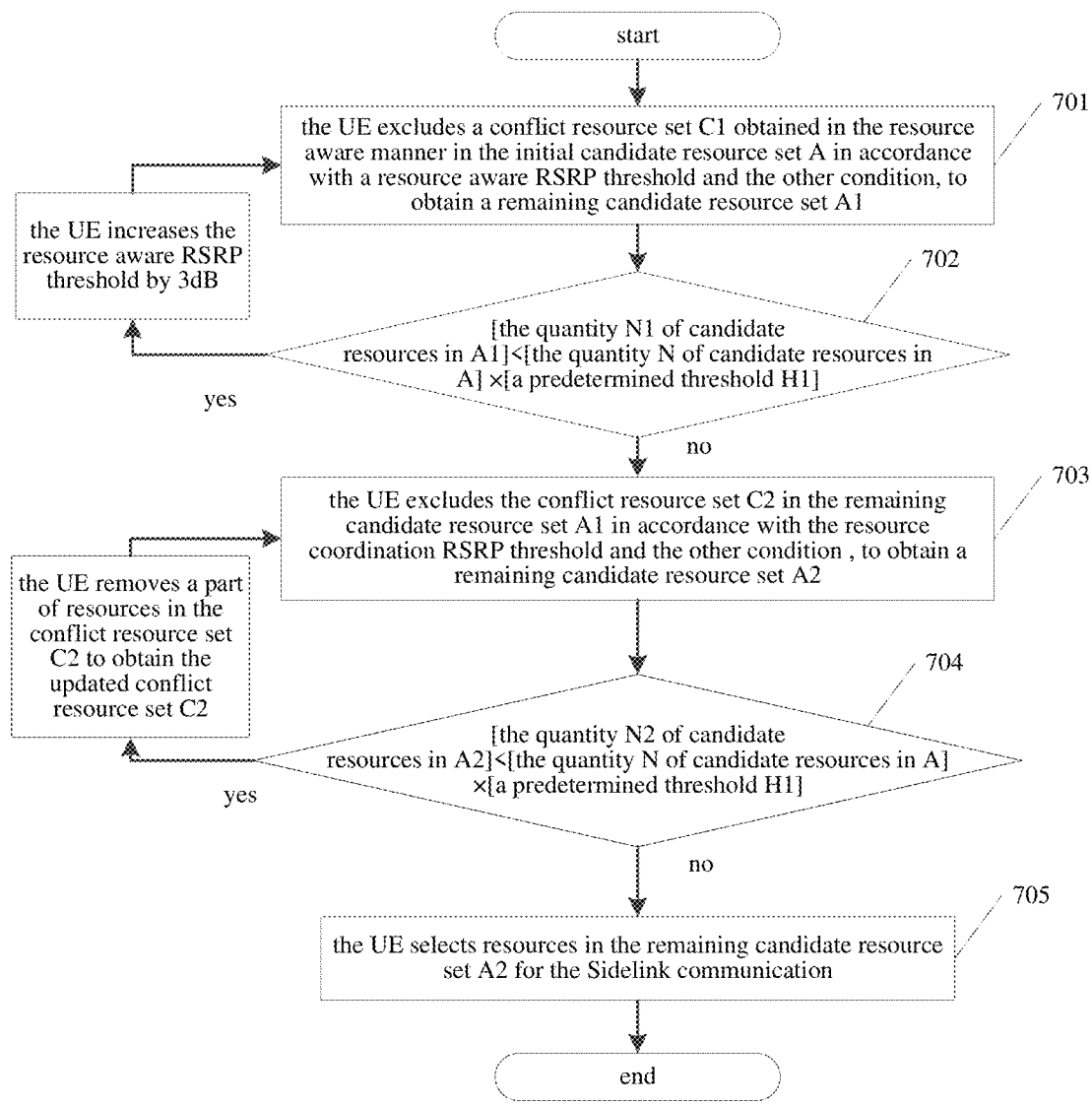
FIG. 7 is still yet another flow chart of the resource processing method according to an embodiment of the present disclosure.

As shown in FIG. 7, when an initial candidate resource set for a UE is A and the coordination information does not include the interference information, the resource processing method in the embodiments of the present disclosure includes the following steps.

Step 701: the UE excludes a conflict resource set C1 in the initial candidate resource set A in accordance with a resource aware RSRP threshold and the other condition (e.g., a priority level of a data packet or a user), to obtain a remaining candidate resource set A1.

Step 702: when the quantity of candidate resources in the remaining candidate resource set A1 meets a formula (6), i.e., [the quantity N1 of candidate resources in A1]<[the quantity N of candidate resources in A]×[a predetermined threshold H1] (6), the UE increases the resource aware RSRP threshold by 3 db, and returns to Step 701 so as to re-perform the resource exclusion in the initial candidate resource set A. When the quantity N1 of candidate resources in the remaining candidate resource set A1 does not meet (6), the UE proceeds to Step 703. The predetermined threshold H1 is a preconfigured value.

Step 703: the UE excludes the conflict resource set C2 in the coordination information transmitted by the other UE in the remaining candidate resource set A1 (when the resource exclusion is performed for the first time, the conflict resource set C2 in the coordination information transmitted by the other UE is directly excluded, and when the resource exclusion is performed for an $n^{th}$ time (n≥2), the updated conflict resource set C2 is excluded), to obtain a remaining candidate resource set A2.

Step 704: when the quantity of candidate resources in the remaining candidate resource set A2 meets a formula (7), i.e., [the quantity N2 of candidate resources in A2]<[the quantity N of candidate resources in A]×[a predetermined threshold H1] (7), the UE removes a part of resources in the conflict resource set C2 to obtain the updated conflict resource set C2, and returns to Step 703 so as to re-perform the resource exclusion in the initial candidate resource set A. The predetermined threshold H1 is a preconfigured value. When the quantity N2 of candidate resources in the remaining candidate resource set A2 does not meet the formula (7), the UE proceeds to Step 705.

Step 705: the UE selects resources in the remaining candidate resource set A2 for the Sidelink communication.

Based on the above-mentioned resource processing method, after performing the resource exclusion in a resource aware manner, when it finds that there are insufficient resources in the remaining candidate resource set A1, the resource aware threshold is adjusted at first so as to re-perform the resource exclusion in the initial candidate resource set A, and then the coordination resource exclusion is performed. When the quantity of the resources in the remaining candidate resource set A2 does not meet the predetermined requirement, the resource coordination threshold is adjusted so as to re-perform the resource exclusion in the remaining candidate resource A1. Hence, the scheme is more flexible, and it is able to perform the resource exclusion separately in a resource aware manner and resource coordination.

In an embodiment of the present disclosure, the resource exclusion is performed at first through resource coordination; when there are insufficient resources after the resource coordination and exclusion, the resource coordination threshold is increased to re-perform the resource exclusion; when the quantity of resources meets the predetermined requirement after the resource coordination and exclusion, the resource exclusion is performed in a resource aware manner; and when there are insufficient resources after the resource exclusion performed in a resource aware manner, the resource aware threshold is increased to re-perform the resource exclusion until sufficient resources are obtained.

A mode for determining a conflict resource set C2 depends on whether the coordination information includes the interference intensity information. When the coordination information includes the interference intensity information, the conflict resource set C2 in the coordination information transmitted by the other UE is determined in accordance with the coordination information and the resource coordination threshold. When the coordination information does not include the interference intensity information, the conflict resource set C2 is formed through randomly selecting the conflict resources in the coordination information transmitted by the other UE.

Figure 8:
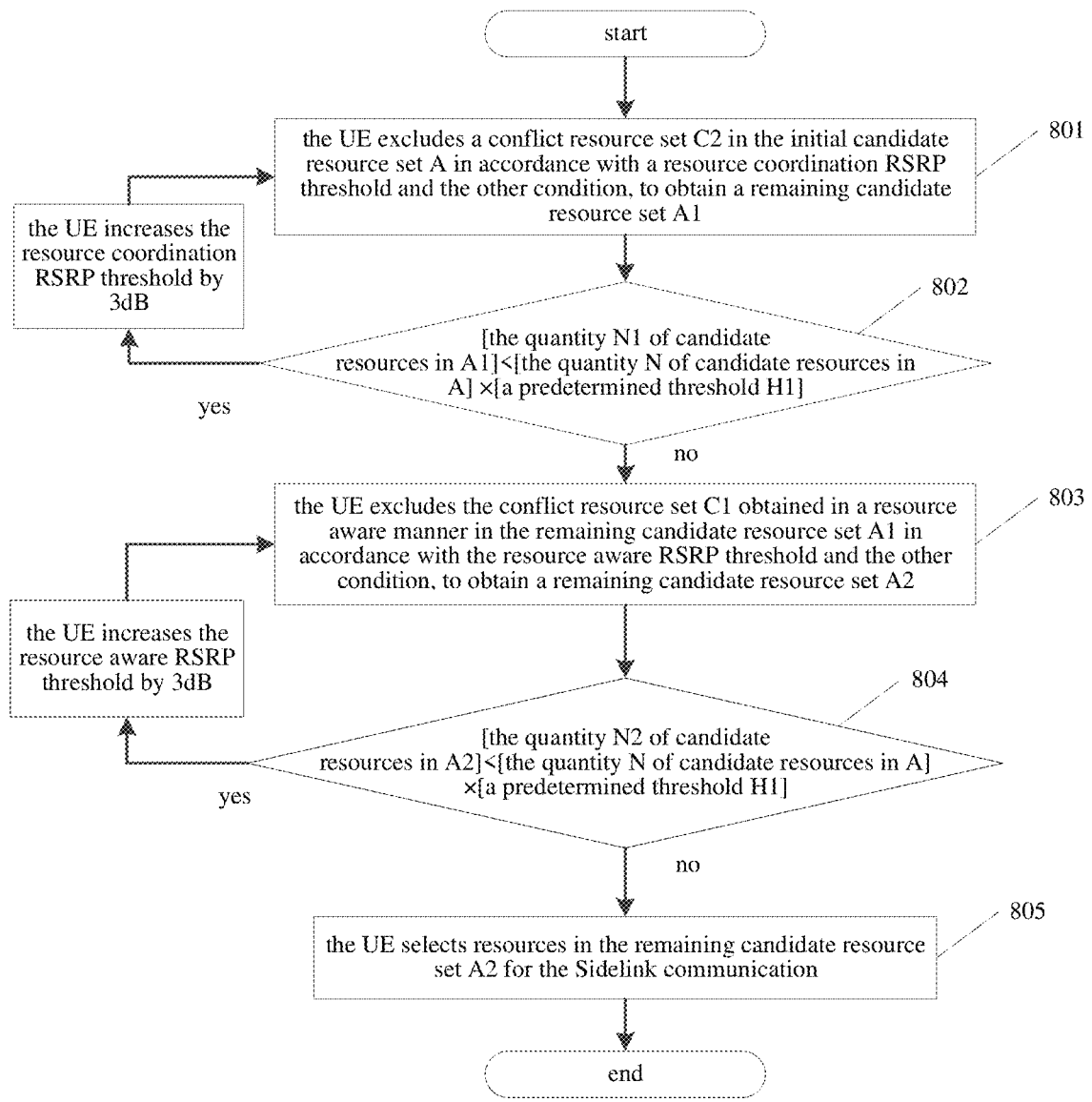
FIG. 8 is still yet another flow chart of the resource processing method according to an embodiment of the present disclosure.

As shown in FIG. 8, when an initial candidate resource set for a UE is A and the coordination information includes the interference information, the resource processing method in the embodiments of the present disclosure includes the following steps.

Step 801: the UE excludes a conflict resource set C2 in the coordination information transmitted by the other UE in the initial candidate resource set A in accordance with an RSRP threshold and the other condition (e.g., a priority level of a data packet or a user) obtained through resource coordination, to obtain a remaining candidate resource set A1.

Step 802: when the quantity of candidate resources N1 in the remaining candidate resource set A1 meets a formula (8), i.e., [the quantity N1 of candidate resources in A1]<[the quantity N of candidate resources in A]×[a predetermined threshold H1], the UE increases the resource coordination RSRP threshold by 3 db, and returns to Step 801 so as to re-perform the resource exclusion in the initial candidate resource set A. When the quantity of candidate resources in the remaining candidate resource set A1 does not meet the formula (8), the UE proceeds to Step 803. The predetermined threshold H1 is a preconfigured value.

Step 803: the UE excludes the conflict resource set C1 obtained in a resource aware manner in the remaining candidate resource set A1 in accordance with the resource aware RSRP threshold and the other condition (e.g., a priority level of a data packet or a user), to obtain a remaining candidate resource set A2.

Step 804: when the quantity N2 of candidate resources in the remaining candidate resource set A2 meets a formula (9), i.e., [the quantity N2 of candidate resources in A2]<[the quantity N of candidate resources in A]×[a predetermined threshold H1], the UE increases the resource aware RSRP threshold by 3 db, and returns to Step 803 so as to re-perform the resource exclusion in the remaining candidate resource set A1. When the quantity N2 of candidate resources in the remaining candidate resource set A2 does not meet the formula (9), the UE proceeds to Step 805. The predetermined threshold H1 is a preconfigured value.

Step 805: the UE selects resources in the remaining candidate resource set A2 for the Sidelink communication.

Figure 9:
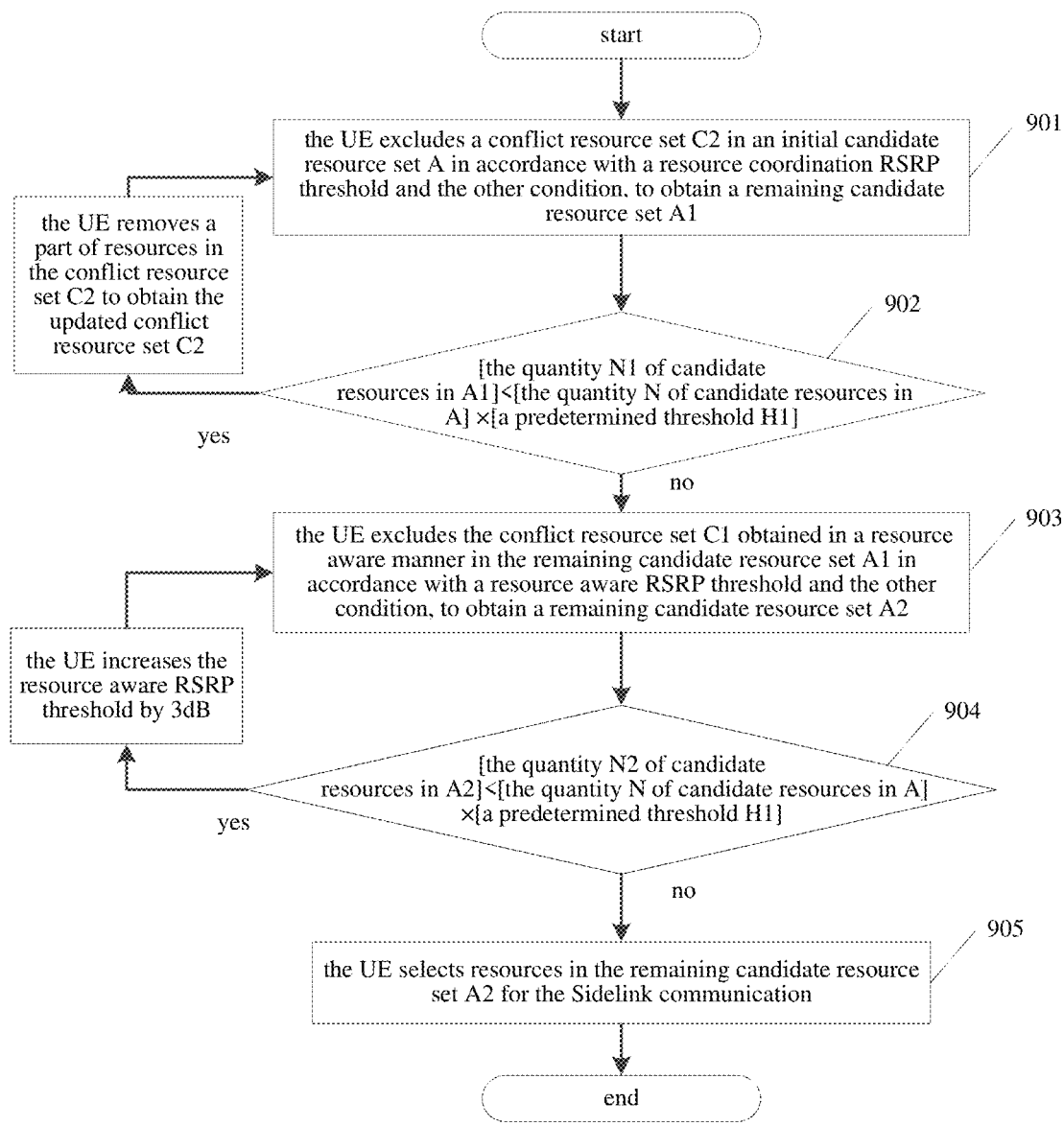
FIG. 9 is still yet another flow chart of the resource processing method according to an embodiment of the present disclosure.

As shown in FIG. 9, when an initial candidate resource set for a UE is A and the coordination information does not include the interference information, the resource processing method in the embodiments of the present disclosure includes the following steps.

Step 901: the UE excludes a conflict resource set C2 in the initial candidate resource set A in accordance with a resource coordination RSRP threshold and the other condition (when the resource exclusion is performed for the first time, the conflict resource set C2 in the coordination information transmitted by the other UE is directly excluded, and when the resource exclusion is performed for an $n^{th}$ time (n≥2), the updated conflict resource set C2 is excluded), to obtain a remaining candidate resource set A1.

Step 902: when the quantity N1 of candidate resources in the remaining candidate resource set A1 meets a formula (10), i.e., [the quantity N1 of candidate resources in A1]< [the quantity N of candidate resources in A]×[a predetermined threshold H1], the UE removes a part of resources in the conflict resource set C2 to obtain the updated conflict resource set C2, and returns to Step 901 so as to re-perform the resource exclusion in the initial candidate resource set A. When the quantity of candidate resources in the remaining candidate resource set A1 does not meet the formula (10), the UE proceeds to Step 903. The predetermined threshold H1 is a preconfigured value.

Step 903: the UE excludes the conflict resource set C1 obtained in a resource aware manner in the remaining candidate resource set A1 in accordance with a resource aware RSRP threshold and the other condition (e.g., a priority level of a data packet or a user), to obtain a remaining candidate resource set A2.

Step 904: when the quantity N1 of candidate resources in the remaining candidate resource set A2 meets a formula (11), i.e., [the quantity N2 of candidate resources in A2]< [the quantity N of candidate resources in A]×[a predetermined threshold H1], the UE increase the resource aware RSRP threshold by 3 db, and returns to Step 903 so as to re-perform the resource exclusion in the remaining candidate resource set A1. When the quantity N2 of candidate resources in the remaining candidate resource set A2 does not meet (11), the UE proceeds to Step 905.

Step 905: the UE selects resources in the remaining candidate resource set A2 for the Sidelink communication.

Based on the above-mentioned resource processing method, the coordination resource exclusion is performed at first, and when it finds that there are insufficient resources in the remaining candidate resource set A1, a part of resources are removed in the conflict resource set C2. Then, whether the quantity of resources in the remaining candidate resource set A1 meets the predetermined requirement is determined. When the predetermined requirement has been met, the aware resource exclusion is performed. Then, when the quantity of resources in the remaining candidate resource set A2 after the exclusion does not meet the predetermined requirement, the resource aware threshold is adjusted, and the resource exclusion is re-performed in the remaining candidate resource set A1. Hence, the scheme is more flexible, and it is able to perform the resource exclusion separately in a resource aware manner and through the resource coordination.

In the embodiments of the present disclosure, when the UE removes a part of resources in the conflict resource set C2 to obtain the updated conflict resource set C2, it means that the UE randomly selects a part of resources in the conflict resource set C2, and removes the selected part of resources from the conflict resource set C2, to obtain the updated conflict resource set C2 containing fewer resources.

When the UE randomly selects a part of resources in the conflict resource set C2 and removes the selected part of resources in the conflict resource set C2, the quantity M of resources removed each time is calculated through [the quantity M of resources removed each time]=[the quantity K of resources in the initial conflict resource set C2]×Y %, where Y is a preconfigured constant greater than 0, e.g., 10%. The initial conflict resource set C2 refers to a conflict resource set indicated in the coordination information.

In other words, M resources are randomly removed from the conflict resource set C2, and then whether A1 or A2 includes sufficient candidate resources is determined. When the candidate resources in A1 or A2 are insufficient, M resources are further randomly removed from the conflict resource set C2, and such procedure may be repeated, until A1 or A2 includes sufficient candidate resources.

It should be appreciated that, in the embodiments of the present disclosure, when the resource aware threshold and the resource coordination threshold are subjected to be adjusted, adjustment values of the resource aware threshold and the resource coordination threshold may be the same or different. Apart from those mentioned hereinabove, the adjustment of the resource aware threshold and the resource coordination threshold may also be stopped when the other condition has been met, e.g., when the resource scheduling delay exceeds the predetermined maximum delay threshold.

Figure 10:
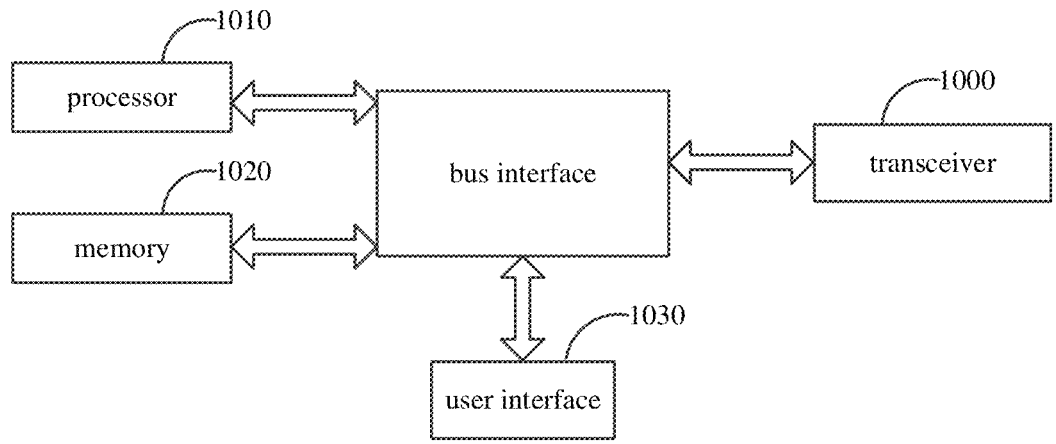
FIG. 10 is a schematic view showing a resource processing device according to an embodiment of the present disclosure.

As shown in FIG. 10, the present disclosure provides in some embodiments a resource processing device for a first UE, which includes a memory 1020, a transceiver 1000 and a processor 1010. The processor 1010 is configured to read a computer program in the memory to: determine a first conflict resource set in a resource aware manner; determine a second conflict resource set, wherein the second conflict resource set is determined in accordance with coordination information from a second UE; perform resource exclusion in an initial candidate resource set in accordance with the first conflict resource set and the second conflict resource set, to obtain a remaining candidate resource set; and when the quantity of resources in the remaining candidate resource set does not meet a predetermined requirement, re-perform resource exclusion in the initial candidate resource set. The transceiver 1000 is configured to transmit and receive data under the control of the processor 1010.

In FIG. 10, bus architecture may include a number of buses and bridges connected to each other, so as to connect various circuits for one or more processors 1010 and one or more memories 1020. In addition, as is known in the art, the bus architecture may be used to connect any other circuits, such as a circuit for a peripheral device, a circuit for a voltage stabilizer and a power management circuit. A bus interface may be provided, and the transceiver 1000 may consist of a plurality of elements, i.e., a transmitter and a receiver for communication with any other devices over a transmission medium. With respect to different UEs, a user interface 1030 may also be provided for devices which are to be arranged inside or outside the UE, and these devices may include but not limited to a keypad, a display, a speaker, a microphone and a joystick.

The processor 1010 may take charge of managing the bus architecture as well as general processings. The memory 1020 may store therein data for the operation of the processor 1010.

Optionally, the processor 1010 is a Central Processing Unit (CPU), an Application Specific Integrated Circuit (ASIC), a Field-Programmable Gate Array (FPGA) or a Complex Programmable Logic Device (CPLD). The processor may also use multi-core architecture.

The processor is configured to call the computer program in the memory to implement the above-mentioned method in accordance with obtained executable instructions. Alternatively, the processor may also be physically separated from the memory.

In an embodiment of the present disclosure, the processor is further configured to read the computer program in the memory to: exclude the first conflict resource set in the initial candidate resource set to obtain a first candidate resource set, and exclude the second conflict resource set in the first candidate resource set to obtain a second candidate resource set as the remaining candidate resource set; or exclude the second conflict resource set in the initial candidate resource set to obtain a third candidate resource set, and exclude the first conflict resource set in the third candidate resource set to obtain a fourth candidate resource set as the remaining candidate resource set.

In an embodiment of the present disclosure, the processor is further configured to read the computer program in the memory to determine the second conflict resource set in conflict resources indicated through the coordination information in accordance with the coordination information and/or a resource coordination threshold.

In an embodiment of the present disclosure, the processor is further configured to read the computer program in the memory to exclude an updated second conflict resource set in the first candidate resource set to obtain the second candidate resource set, wherein the updated second conflict resource set is obtained through removing a part of resources in the second conflict resource set.

In an embodiment of the present disclosure, the processor is further configured to read the computer program in the memory to: re-determine at least one of the first conflict resource set or the second conflict resource set; and re-perform the resource exclusion in the initial candidate resource set in accordance with the at least one of the re-determined first conflict resource set or the re-determined second conflict resource set.

In an embodiment of the present disclosure, the processor is further configured to read the computer program in the memory to adjust a resource aware threshold, and re-determine the first conflict resource set in accordance with the adjusted resource aware threshold.

In an embodiment of the present disclosure, the processor is further configured to read the computer program in the memory to: when the coordination information includes interference intensity information, adjust the resource coordination threshold, and re-determine the second conflict resource set in accordance with the adjusted resource coordination threshold; and when the coordination information does not include the interference intensity information, remove a part of resources from the second conflict resource set to obtain an updated second conflict resource set, and take the updated second conflict resource set as the re-determined second conflict resource set.

In an embodiment of the present disclosure, the quantity of the removed resources is determined in accordance with a preconfigured value and the quantity of resources indicated in the coordination information.

In an embodiment of the present disclosure, the predetermined requirement is that the quantity of resources in the remaining candidate resource set is greater than a product of a preset threshold and the quantity of resources in the initial candidate resource set.

It should be appreciated that, the resource processing device in the embodiments of the present disclosure is used to implement all the steps of the above-mentioned method with a same technical effect, which will not be repeatedly defined herein.

Figure 11:
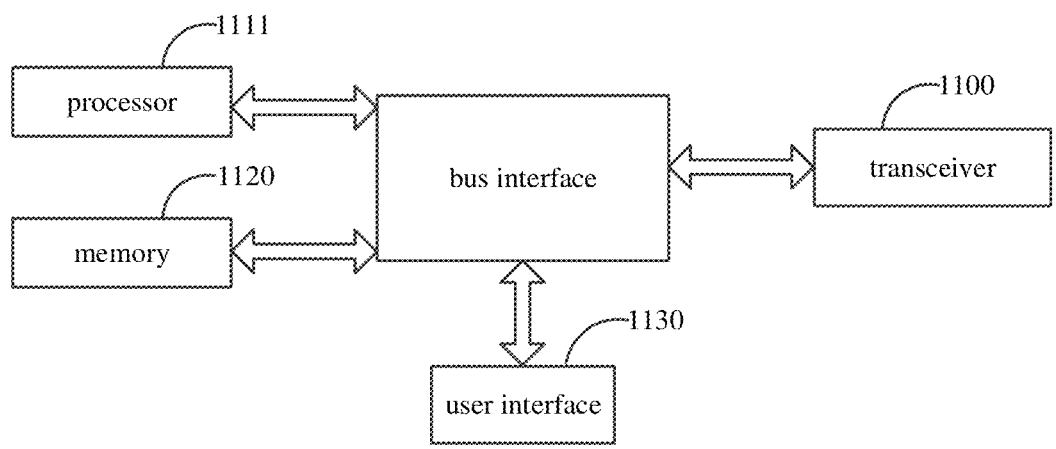
FIG. 11 is another schematic view showing the resource processing device according to an embodiment of the present disclosure.

As shown in FIG. 11, the present disclosure further provides in some embodiments a resource processing device for a first UE, which includes a memory 1120, a transceiver 1100 and a processor 1111. The processor 1111 is configured to read a computer program in the memory to: determine a first conflict resource set; perform resource exclusion in an initial candidate resource set in accordance with the first conflict resource set, to obtain a first candidate resource set; determine a second conflict resource set; perform resource exclusion in accordance with the first candidate resource set and the second conflict resource set, to obtain a second candidate resource set; and when the quantity of resources in the second candidate resource set does not meet a predetermined requirement, re-perform resource exclusion in the second candidate resource set. The first conflict resource set is determined in a resource aware manner, and the second conflict resource set is determined in accordance with coordination information received from a second UE; or the first conflict resource set is determined in accordance with the coordination information received from the second UE, and the second conflict resource set is determined in a resource aware manner. The transceiver 1100 is configured to receive and transmit data under the control of the processor.

In FIG. 11, bus architecture may include a number of buses and bridges connected to each other, so as to connect various circuits for one or more processors 1111 and one or more memories 1120. In addition, as is known in the art, the bus architecture may be used to connect any other circuits, such as a circuit for a peripheral device, a circuit for a voltage stabilizer and a power management circuit. A bus interface may be provided, and the transceiver 1100 may consist of a plurality of elements, i.e., a transmitter and a receiver for communication with any other devices over a transmission medium. With respect to different UEs, a user interface 1130 may also be provided for devices which are to be arranged inside or outside the UE, and these devices may include but not limited to a keypad, a display, a speaker, a microphone and a joystick.

The processor 1111 may take charge of managing the bus architecture as well as general processings. The memory 1120 may store therein data for the operation of the processor 1111.

In an embodiment of the present disclosure, the processor 1111 is a CPU, an ASIC, an FPGA or a CPLD. The processor may also use multi-core architecture.

The processor is configured to call the computer program in the memory to implement the above-mentioned method in accordance with obtained executable instructions. The processor may also be physically separated from the memory.

In an embodiment of the present disclosure, the processor is further configured to read the computer program in the memory to: exclude the first conflict resource set in the initial candidate resource set to obtain the first candidate resource set; and when the quantity of resources in the first candidate resource set does not meet the predetermined requirement, adjust a resource aware threshold, re-determine the first conflict resource set in accordance with the adjusted resource aware threshold, and exclude the re-determined first conflict resource set in the initial candidate resource set, until the quantity of resources in the first candidate resource set meets the predetermined requirement.

In an embodiment of the present disclosure, the processor is further configured to read the computer program in the memory to determine the second conflict resource set in accordance with the coordination information and a resource coordination threshold.

In an embodiment of the present disclosure, the processor is further configured to read the computer program in the memory to, when the quantity of resources in the first candidate resource set meets the predetermined requirement, exclude the second conflict resource set in the first candidate resource set to obtain the second candidate resource set, or exclude an updated second conflict resource set in the first candidate resource set to obtain the second candidate resource set, wherein the updated second conflict resource set is obtained through removing a part of resources in the second conflict resource set.

In an embodiment of the present disclosure, the processor is further configured to read the computer program in the memory to: re-determine the second conflict resource set; and re-perform the resource exclusion in the first candidate resource set in accordance with the re-determined second conflict resource set.

In an embodiment of the present disclosure, the processor is further configured to read the computer program in the memory to: when the coordination information includes interference intensity information, adjust a resource coordination threshold, and re-determine the second conflict resource set in accordance with the adjusted resource coordination threshold; and when the coordination information does not include interference intensity information, remove a part of resources in the second conflict resource set to obtain an updated second conflict resource set, and take the updated second conflict resource set as the re-determined second conflict resource set.

In an embodiment of the present disclosure, the processor is further configured to read the computer program in the memory to, when the first conflict resource set is determined in accordance with the coordination information received from the second UE, the second conflict resource set is determined in a resource aware manner, and the coordination information includes the interference intensity information, determine the first conflict resource set in conflict resources indicated in the coordination information in accordance with the coordination information and/or a resource coordination threshold.

In an embodiment of the present disclosure, the processor is further configured to read the computer program in the memory to: exclude the first conflict resource set in the initial candidate resource set to obtain the first candidate resource set; and when the quantity of resources in the first candidate resource set does not meet the predetermined requirement, adjust the resource coordination threshold, re-determine the first conflict resource set in accordance with the adjusted resource coordination threshold, and exclude the re-determined first conflict resource set in the initial candidate resource set, until the quantity of resources in the first candidate resource set meets the predetermined requirement.

In an embodiment of the present disclosure, the processor is further configured to read the computer program in the memory to: when the first conflict resource set is determined in accordance with the coordination information received from the second UE, the second conflict resource set is determined in a resource aware manner and the coordination information does not include the interference intensity information, exclude the first conflict resource set in the initial candidate resource set to obtain the first candidate resource set, or exclude an updated first conflict resource set in the initial candidate resource set to obtain the first candidate resource set, wherein the updated first conflict resource set is obtained through removing a part of resources in the first conflict resource set; and when the quantity of resources in the first candidate resource set does not meet the predetermined requirement, remove a part of resources to obtain a re-determined first conflict resource set, and exclude the re-determined first conflict resource set in the initial candidate resource set, until the quantity of resources in the first candidate resource set meets the predetermined requirement.

In an embodiment of the present disclosure, the processor is further configured to read the computer program in the memory to, when the quantity of resources in the first candidate resource set meets the predetermined requirement, exclude the second conflict resource set in the first candidate resource set to obtain the second candidate resource set.

In an embodiment of the present disclosure, the processor is further configured to read the computer program in the memory to: re-determine the second conflict resource set; and re-perform the resource exclusion in the first candidate resource set in accordance with the re-determined second conflict resource set.

In an embodiment of the present disclosure, the processor is further configured to read the computer program in the memory to adjust a resource aware threshold, and re-determine the second conflict resource set in accordance with the adjusted resource aware threshold.

In an embodiment of the present disclosure, the predetermined requirement is that the quantity of resources in the second candidate resource set or the first candidate resource set is greater than a product of a preset threshold and the quantity of resources in the initial candidate resource set.

In an embodiment of the present disclosure, the quantity of the removed resources is determined in accordance with a preconfigured value and the quantity of conflict resources indicated in the coordination information.

It should be appreciated that, the resource processing device in the embodiments of the present disclosure is used to implement all the steps of the above-mentioned method with a same technical effect, which will not be repeatedly defined herein.

Figure 12:
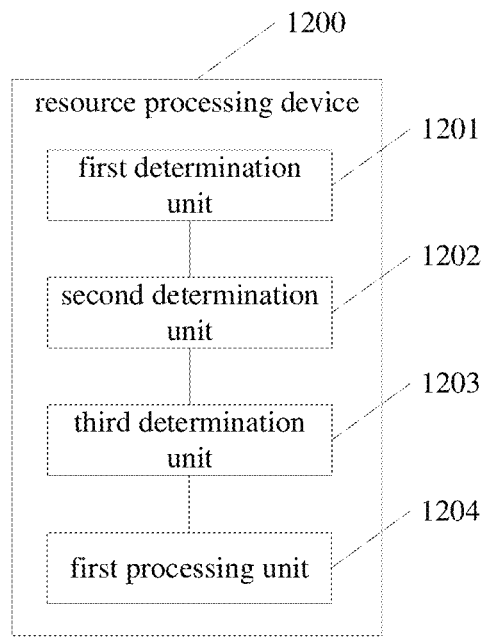
FIG. 12 is yet another schematic view showing the resource processing device according to an embodiment of the present disclosure.

As shown in FIG. 12, the present disclosure further provides in some embodiments a resource processing device for a first UE, which includes: a first determination unit 1201 configured to determine a first conflict resource set in a resource aware manner; a second determination unit 1202 configured to determine a second conflict resource set, wherein the second conflict resource set is determined in accordance with coordination information from a second UE; a third determination unit 1203 configured to perform resource exclusion in an initial candidate resource set in accordance with the first conflict resource set and the second conflict resource set, to obtain a remaining candidate resource set; and a first processing unit 1204 configured to, when the quantity of resources in the remaining candidate resource set does not meet a predetermined requirement, re-perform resource exclusion in the initial candidate resource set.

In an embodiment of the present disclosure, the third determination unit 1203 includes: a first exclusion sub-unit configured to exclude the first conflict resource set in the initial candidate resource set to obtain a first candidate resource set, and a second exclusion sub-unit configured to exclude the second conflict resource set in the first candidate resource set to obtain a second candidate resource set as the remaining candidate resource set; or a third exclusion sub-unit configured to exclude the second conflict resource set in the initial candidate resource set to obtain a third candidate resource set, and a fourth exclusion sub-unit exclude the first conflict resource set in the third candidate resource set to obtain a fourth candidate resource set as the remaining candidate resource set.

In an embodiment of the present disclosure, the second determination unit is further configured to determine the second conflict resource set in conflict resources indicated through the coordination information in accordance with the coordination information and/or a resource coordination threshold.

In an embodiment of the present disclosure, the second determination unit is further configured to exclude an updated second conflict resource set in the first candidate resource set to obtain the second candidate resource set, wherein the updated second conflict resource set is obtained through removing a part of resources in the second conflict resource set.

In an embodiment of the present disclosure, the first processing unit includes: a first determination sub-unit configured to re-determine at least one of the first conflict resource set or the second conflict resource set; and a second determination sub-unit configured to re-perform the resource exclusion in the initial candidate resource set in accordance with the at least one of the re-determined first conflict resource set or the re-determined second conflict resource set.

In an embodiment of the present disclosure, the first determination sub-unit is further configured to adjust a resource aware threshold, and re-determine the first conflict resource set in accordance with the adjusted resource aware threshold.

In an embodiment of the present disclosure, the first determination sub-unit is further configured to: when the coordination information includes interference intensity information, adjust the resource coordination threshold, and re-determine the second conflict resource set in accordance with the adjusted resource coordination threshold; and when the coordination information does not include the interference intensity information, remove a part of resources from the second conflict resource set to obtain an updated second conflict resource set, and take the updated second conflict resource set as the re-determined second conflict resource set.

In an embodiment of the present disclosure, the quantity of the removed resources is determined in accordance with a preconfigured value and the quantity of resources indicated in the coordination information.

In an embodiment of the present disclosure, the predetermined requirement is that the quantity of resources in the remaining candidate resource set is greater than a product of a preset threshold and the quantity of resources in the initial candidate resource set.

It should be appreciated that, the resource processing device in the embodiments of the present disclosure is used to implement all the steps of the above-mentioned method with a same technical effect, which will not be repeatedly defined herein.

Figure 13:
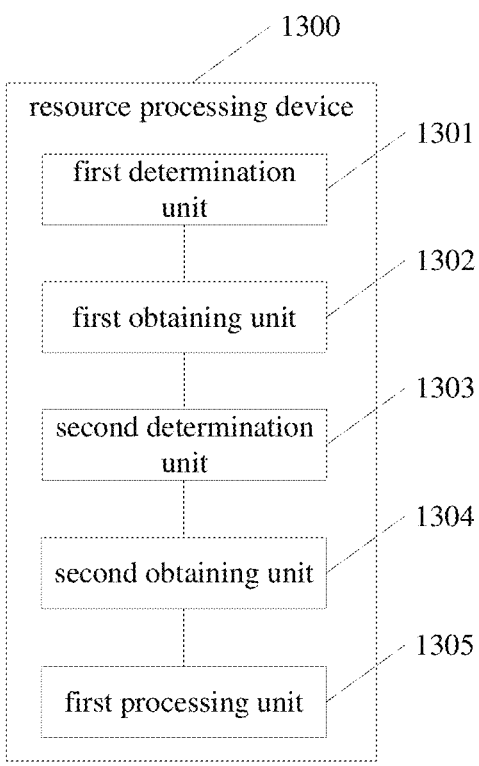
FIG. 13 is still yet another schematic view showing the resource processing device according to an embodiment of the present disclosure.

As shown in FIG. 13, the present disclosure further provides in some embodiments a resource processing device for a first UE, which includes: a first determination unit 1301 configured to determine a first conflict resource set; a first obtaining unit 1302 configured to perform resource exclusion in an initial candidate resource set in accordance with the first conflict resource set, to obtain a first candidate resource set; a second determination unit 1303 configured to determine a second conflict resource set; a second obtaining unit 1304 configured to perform resource exclusion in accordance with the first candidate resource set and the second conflict resource set, to obtain a second candidate resource set; and a first processing unit 1305 configured to, when the quantity of resources in the second candidate resource set does not meet a predetermined requirement, re-perform resource exclusion in the second candidate resource set. The first conflict resource set is determined in a resource aware manner, and the second conflict resource set is determined in accordance with coordination information received from a second UE; or the first conflict resource set is determined in accordance with the coordination information received from the second UE, and the second conflict resource set is determined in a resource aware manner.

In an embodiment of the present disclosure, when the first conflict resource set is determined in a resource aware manner and the second conflict resource set is determined in accordance with the coordination information received from the second UE, the first obtaining unit is further configured to: exclude the first conflict resource set in the initial candidate resource set to obtain the first candidate resource set; and when the quantity of resources in the first candidate resource set does not meet the predetermined requirement, adjust a resource aware threshold, re-determine the first conflict resource set in accordance with the adjusted resource aware threshold, and exclude the re-determined first conflict resource set in the initial candidate resource set, until the quantity of resources in the first candidate resource set meets the predetermined requirement.

In an embodiment of the present disclosure, the second determination unit is further configured to determine the second conflict resource set in accordance with the coordination information and a resource coordination threshold.

In an embodiment of the present disclosure, the second obtaining unit is further configured to, when the quantity of resources in the first candidate resource set meets the predetermined requirement, exclude the second conflict resource set in the first candidate resource set to obtain the second candidate resource set, or exclude an updated second conflict resource set in the first candidate resource set to obtain the second candidate resource set, wherein the updated second conflict resource set is obtained through removing a part of resources in the second conflict resource set.

In an embodiment of the present disclosure, the first processing unit is further configured to: re-determine the second conflict resource set; and re-perform the resource exclusion in the first candidate resource set in accordance with the re-determined second conflict resource set.

In an embodiment of the present disclosure, the first processing unit is further configured to: when the coordination information includes interference intensity information, adjust a resource coordination threshold, and re-determine the second conflict resource set in accordance with the adjusted resource coordination threshold; and when the coordination information does not include interference intensity information, remove a part of resources in the second conflict resource set to obtain an updated second conflict resource set, and take the updated second conflict resource set as the re-determined second conflict resource set.

In an embodiment of the present disclosure, when the first conflict resource set is determined in accordance with the coordination information received from the second UE, the second conflict resource set is determined in a resource aware manner, and the coordination information includes the interference intensity information, the first determination unit is further configured to determine the first conflict resource set in conflict resources indicated in the coordination information in accordance with the coordination information and/or a resource coordination threshold.

In an embodiment of the present disclosure, the first obtaining unit is further configured to: exclude the first conflict resource set in the initial candidate resource set to obtain the first candidate resource set; and when the quantity of resources in the first candidate resource set does not meet the predetermined requirement, adjust the resource coordination threshold, re-determine the first conflict resource set in accordance with the adjusted resource coordination threshold, and exclude the re-determined first conflict resource set in the initial candidate resource set, until the quantity of resources in the first candidate resource set meets the predetermined requirement.

In an embodiment of the present disclosure, when the first conflict resource set is determined in accordance with the coordination information received from the second UE, the second conflict resource set is determined in a resource aware manner and the coordination information does not include the interference intensity information, the first obtaining unit is further configured to: exclude the first conflict resource set in the initial candidate resource set to obtain the first candidate resource set, or exclude an updated first conflict resource set in the initial candidate resource set to obtain the first candidate resource set, wherein the updated first conflict resource set is obtained through removing a part of resources in the first conflict resource set; and when the quantity of resources in the first candidate resource set does not meet the predetermined requirement, remove a part of resources to obtain a re-determined first conflict resource set, and exclude the re-determined first conflict resource set in the initial candidate resource set, until the quantity of resources in the first candidate resource set meets the predetermined requirement.

In an embodiment of the present disclosure, the second obtaining unit is further configured to, when the quantity of resources in the first candidate resource set meets the predetermined requirement, exclude the second conflict resource set in the first candidate resource set to obtain the second candidate resource set.

In an embodiment of the present disclosure, the second obtaining unit includes: a first determination sub-unit configured to re-determine the second conflict resource set; and a second determination sub-unit configured to re-perform the resource exclusion in the first candidate resource set in accordance with the re-determined second conflict resource set.

In an embodiment of the present disclosure, the first determination sub-unit is further configured to adjust a resource aware threshold, and re-determine the second conflict resource set in accordance with the adjusted resource aware threshold.

In an embodiment of the present disclosure, the predetermined requirement is that the quantity of resources in the second candidate resource set or the first candidate resource set is greater than a product of a preset threshold and the quantity of resources in the initial candidate resource set.

In an embodiment of the present disclosure, the quantity of the removed resources is determined in accordance with a preconfigured value and the quantity of conflict resources indicated in the coordination information.

It should be appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) or a processor to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The present disclosure further provides in some embodiments a readable storage medium storing therein a computer program. The computer program is used to be executed by a processor to implement the above-mentioned method with a same technical effect, which will not be repeatedly defined herein. The readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include instructions so as to enable a terminal device (mobile phone, computer, server, air conditioner or network device) to execute the method in the embodiments of the present disclosure.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, this module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A and B" in the specification and the appended claims shall be understood as "there is only A, there is only B, or there are both A and B".

The embodiments of the present disclosure have been described above in conjunction with the drawings, but the present disclosure is not limited thereto. The above-mentioned specific implementations are only illustrative and not restrictive. Under the teaching of the present disclosure, many forms can be made without departing from the principle of the present disclosure and the protection scope of the claims, all of which fall within the protection of the present disclosure.

What is claimed is:

1. A resource processing method, comprising:
   determining, by a first User Equipment (UE), a first conflict resource set in a resource aware manner;
   determining, by the first UE, a second conflict resource set, wherein the second conflict resource is determined in accordance with coordination information from a second UE;
   performing, by the first UE, resource exclusion in an initial candidate resource set in accordance with the first conflict resource set and the second conflict resource set, to obtain a remaining candidate resource set;
   when the quantity of resources in the remaining candidate resource set does not meet a predetermined requirement, re-performing, by the first UE, resource exclusion in the initial candidate resource set.

2. The resource processing method according to claim 1, wherein the performing, by the first UE, the resource exclusion in the initial candidate resource set in accordance with the first conflict resource set and the second conflict resource set to obtain the remaining candidate resource set comprises:
   excluding, by the first UE, the first conflict resource set in the initial candidate resource set to obtain a first candidate resource set, and excluding, by the first UE, the second conflict resource set in the first candidate resource set, to obtain a second candidate resource set as the remaining candidate resource set; or
   excluding, by the first UE, the second conflict resource set in the initial candidate resource set to obtain a third candidate resource set, and excluding, by the first UE, the first conflict resource set in the third candidate resource set, to obtain a fourth candidate resource set as the remaining candidate resource set.

3. The resource processing method according to claim 1, wherein the determining, by the first UE, the second conflict resource set in accordance with the coordination information comprises:
   determining, by the first UE, the second conflict resource set in conflict resources indicated through the coordination information in accordance with the coordination information and/or a resource coordination threshold.

4. The resource processing method according to claim 2, wherein the excluding, by the first UE, the second conflict resource set in the first candidate resource set to obtain the second candidate resource set comprises:

excluding, by the first UE, an updated second conflict resource set in the first candidate resource set to obtain the second candidate resource set, wherein the updated second conflict resource set is obtained through removing a part of resources in the second conflict resource set.

5. The resource processing method according to claim 2, wherein the re-performing, by the first UE, the resource exclusion in the initial candidate resource set comprises:
re-determining, by the first UE, at least one of the first conflict resource set or the second conflict resource set;
re-performing, by the first UE, the resource exclusion in the initial candidate resource set in accordance with the at least one of the re-determined first conflict resource set or the re-determined second conflict resource set,
wherein the re-determining, by the first UE, the first conflict resource set comprises:
adjusting, by the first UE, a resource aware threshold, and re-determining, by the first UE, the first conflict resource set in accordance with the adjusted resource aware threshold.

6. The resource processing method according to claim 5, wherein the re-determining, by the first UE, the second conflict resource set comprises:
when the coordination information comprises interference intensity information, adjusting, by the first UE, the resource coordination threshold, and re-determining, by the first UE, the second conflict resource set in accordance with the adjusted resource coordination threshold;
when the coordination information does not comprise the interference intensity information, removing, by the first UE, a part of resources from the second conflict resource set to obtain to obtain an updated second conflict resource set, and taking, by the first UE, the updated second conflict resource set as the re-determined second conflict resource set,
wherein the quantity of the removed resources is determined in accordance with a preconfigured value and the quantity of resources indicated in the coordination information.

7. The resource processing method according to claim 1, wherein the predetermined requirement is that the quantity of resources in the remaining candidate resource set is greater than a product of a preset threshold and the quantity of resources in the initial candidate resource set.

8. A resource processing method, comprising:
determining, by a first UE, a first conflict resource set;
performing, by the first UE, resource exclusion in an initial candidate resource set in accordance with the first conflict resource set, to obtain a first candidate resource set;
determining, by the first UE, a second conflict resource set;
performing, by the first UE, resource exclusion in accordance with the first candidate resource set and the second conflict resource set, to obtain a second candidate resource set;
when the quantity of resources in the second candidate resource set does not meet a predetermined requirement, re-performing, by the first UE, resource exclusion in the second candidate resource set,
wherein the first conflict resource set is determined in a resource aware manner, and the second conflict resource set is determined in accordance with coordination information received from a second UE; or the first conflict resource set is determined in accordance with the coordination information received from the second UE, and the second conflict resource set is determined in a resource aware manner.

9. The resource processing method according to claim 8, wherein when the first conflict resource set is determined in a resource aware manner and the second conflict resource set is determined in accordance with the coordination information received from the second UE, the performing, by the first UE, the resource exclusion in the initial candidate resource set in accordance with the first conflict resource set to obtain the first candidate resource set comprises:
excluding, by the first UE, the first conflict resource set in the initial candidate resource set to obtain the first candidate resource set;
when the quantity of resources in the first candidate resource set does not meet the predetermined requirement, adjusting, by the first UE, a resource aware threshold, re-determining, by the first UE, the first conflict resource set in accordance with the adjusted resource aware threshold, and excluding, by the first UE, the re-determined first conflict resource set in the initial candidate resource set, until the quantity of resources in the first candidate resource set meets the predetermined requirement.

10. The resource processing method according to claim 9, wherein the determining, by the first UE, the second conflict resource set comprises:
determining, by the first UE, the second conflict resource set in accordance with the coordination information and a resource coordination threshold.

11. The resource processing method according to claim 9, wherein the performing, by the first UE, the resource exclusion in accordance with the first candidate resource set and the second conflict resource set to obtain the second candidate resource set comprises:
when the quantity of resources in the first candidate resource set meets the predetermined requirement, excluding, by the first UE, the second conflict resource set in the first candidate resource set to obtain the second candidate resource set, or excluding, by the first UE, an updated second conflict resource set in the first candidate resource set to obtain the second candidate resource set, wherein the updated second conflict resource set is obtained through removing a part of resources in the second conflict resource set.

12. The resource processing method according to claim 9, wherein the re-performing, by the first UE, the resource exclusion in the first candidate resource set when the quantity of resources in the second candidate resource set does not meet the predetermined requirement comprises:
re-determining, by the first UE, the second conflict resource set;
re-performing, by the first UE, the resource exclusion in the first candidate resource set in accordance with the re-determined second conflict resource set.

13. The resource processing method according to claim 12, wherein the re-determining, by the first UE, the second conflict resource set comprises:
when the coordination information comprises interference intensity information, adjusting, by the first UE, a resource coordination threshold, and re-determining the second conflict resource set in accordance with the adjusted resource coordination threshold;
when the coordination information does not comprise interference intensity information, removing, by the first UE, a part of resources in the second conflict resource set to obtain an updated second conflict resource set, and taking, by the first UE, the updated second conflict resource set as the re-determined second conflict resource set.

14. The resource processing method according to claim 8, wherein when the first conflict resource set is determined in accordance with the coordination information received from the second UE, the second conflict resource set is determined in a resource aware manner, and the coordination information comprises the interference intensity information, the determining, by the first UE, the first conflict resource set comprises:
   determining, by the first UE, the first conflict resource set in conflict resources indicated in the coordination information in accordance with the coordination information and/or a resource coordination threshold.

15. The resource processing method according to claim 14, wherein the performing, by the first UE, the resource exclusion in the initial candidate resource set in accordance with the first conflict resource set to obtain the first candidate resource set comprises:
   excluding, by the first UE, the first conflict resource set in the initial candidate resource set to obtain the first candidate resource set;
   when the quantity of resources in the first candidate resource set does not meet the predetermined requirement, adjusting, by the first UE, the resource coordination threshold, re-determining, by the first UE, the first conflict resource set in accordance with the adjusted resource coordination threshold, and excluding, by the first UE, the re-determined first conflict resource set in the initial candidate resource set, until the quantity of resources in the first candidate resource set meets the predetermined requirement.

16. The resource processing method according to claim 8, wherein the first conflict resource set is determined in accordance with the coordination information received from the second UE, the second conflict resource set is determined in a resource aware manner, and when the coordination information does not comprise the interference intensity information, the performing, by the first UE, the resource exclusion in the initial candidate resource set in accordance with the first conflict resource set to obtain the first candidate resource set comprises:
   excluding, by the first UE, the first conflict resource set in the initial candidate resource set to obtain the first candidate resource set, or excluding, by the first UE, an updated first conflict resource set in the initial candidate resource set to obtain the first candidate resource set, wherein the updated first conflict resource set is obtained through removing a part of resources in the first conflict resource set;
   when the quantity of resources in the first candidate resource set does not meet the predetermined requirement, removing, by the first UE, a part of resources to obtain a re-determined first conflict resource set, and excluding, by the first UE, the re-determined first conflict resource set in the initial candidate resource set, until the quantity of resources in the first candidate resource set meets the predetermined requirement.

17. The resource processing method according to claim 15, wherein the performing, by the first UE, the resource exclusion in accordance with the first candidate resource set and the second conflict resource set to obtain the second candidate resource set comprises:
   when the quantity of resources in the first candidate resource set meets the predetermined requirement, excluding, by the first UE, the second conflict resource set in the first candidate resource set to obtain the second candidate resource set.

18. The resource processing method according to claim 17, wherein the re-performing, by the first UE, the resource exclusion in the first candidate resource set when the quantity of resources in the second candidate resource set does not meet the predetermined requirement comprises:
   re-determining, by the first UE, the second conflict resource set;
   re-performing, by the first UE, the resource exclusion in the first candidate resource set in accordance with the re-determined second conflict resource set.

19. A resource processing device for a first UE, comprising a memory, a transceiver and a processor,
   wherein the memory is configured to store therein a computer program, the transceiver is configured to transmit and receive data under the control of the processor, and the processor is configured to read the computer program in the memory to:
      determine a first conflict resource set in a resource aware manner;
      determine a second conflict resource set, wherein the second conflict resource set is determined in accordance with coordination information from a second UE;
      perform resource exclusion in an initial candidate resource set in accordance with the first conflict resource set and the second conflict resource set, to obtain a remaining candidate resource set;
   when the quantity of resources in the remaining candidate resource set does not meet a predetermined requirement, re-perform resource exclusion in the initial candidate resource set.

20. A resource processing device for a first UE, comprising a memory, a transceiver and a processor, wherein the memory is configured to store therein a computer program, the transceiver is configured to receive and transmit data under the control of the processor, and the processor is configured to read the computer program in the memory to implement the resource processing method according to claim 8.

* * * * *